United States Patent

Hasuda et al.

[11] Patent Number: 5,905,920
[45] Date of Patent: May 18, 1999

[54] CAMERA WITH MONITORING AND TESTING OF CAMERA SHUTTER OPERATIONS

[75] Inventors: Masanori Hasuda, Yokohama; Akira Katayama, Koganei; Tetsuro Goto, Funabashi; Yukio Uemura, Musashino, all of Japan

[73] Assignee: Nikon Corporation, Tokyo, Japan

[21] Appl. No.: 08/774,239

[22] Filed: Dec. 27, 1996

Related U.S. Application Data

[63] Continuation of application No. 08/204,685, Mar. 2, 1994, abandoned.

[30] Foreign Application Priority Data

| Mar. 2, 1993 | [JP] | Japan | 5-066023 |
| Apr. 9, 1993 | [JP] | Japan | 5-107547 |
| May 28, 1993 | [JP] | Japan | 5-151025 |
| Sep. 9, 1993 | [JP] | Japan | 5-248699 |

[51] Int. Cl.$^6$ .............................. G03B 7/00; G03B 17/02
[52] U.S. Cl. ...................... 396/273; 396/395; 396/536; 73/1.56
[58] Field of Search .................................. 396/263, 387, 396/395, 439, 452, 471, 479, 480, 502, 483, 484, 213, 235, 269, 273, 301, 536; 250/214 P; 73/1.56

[56] References Cited

U.S. PATENT DOCUMENTS

| 4,657,366 | 4/1987 | Tanabe et al. | 354/246 |
| 4,907,027 | 3/1990 | Kobe et al. | 354/435 |
| 5,138,350 | 8/1992 | Cocca | 354/21 |
| 5,225,865 | 7/1993 | Shiomi et al. | 354/456 X |
| 5,345,288 | 9/1994 | Kobayashi et al. | 396/263 |
| 5,465,133 | 11/1995 | Aoki et al. | 354/442 |

Primary Examiner—Safet Metjahic
Assistant Examiner—J. K. Han
Attorney, Agent, or Firm—Staas & Halsey

[57] ABSTRACT

A camera which prevents accidents which could lead to damage to the shutter when performing shutter time tests in the opened state of the back cover of a camera. The camera has a shutter to limit the exposure time of the recording medium which has been loaded, a measurement unit to measure, according to the action of the shutter, the time of the exposure to the recording medium which the shutter performs, and a back cover sensor to detect whether the back cover is open or closed when film or another recording medium has been loaded into the camera. The action of the measurement unit is inhibited when the back cover sensor detects that the back cover is open. The camera also has a drive unit for recording an image on the film or recording medium and a mode selection switch to select between a normal mode in which a photographic action is performed, in which the shutter and the drive unit are activated, and a test mode in which the shutter and the measurement unit are activated but not the drive unit. A shutter control unit may be used during testing so that the shutter is initially activated for an exposure time other than the minimum exposure time, when the shutter performs an exposure of the recording medium.

30 Claims, 22 Drawing Sheets

CAMERA WITH MONITORING AND TESTING OF CAMERA SHUTTER OPERATIONS

This application is a continuation, of application No. 08/204,685, filed Mar. 2, 1994, now abandoned.

BACKGROUND OF THE INVENTION

1. Field of the Invention

The present invention relates to a camera having sensors to detect various operations of the camera and multiple modes of operation and, more particularly, a camera with sensors to detect travel of the shutter and latching of the back cover of the camera, used in test and normal modes of operation of the camera.

2. Description of the Related Art

In cameras heretofore, the light rays from an subject were restricted by a stop in the lens, and furthermore the exposure time of the film was limited by a mechanical shutter. The shutter used in a single lens reflex camera fundamentally comprises two blinds, a front blind and a rear blind; before the exposure, the front blind covers the film image plane. By depressing the shutter button, firstly the front blind moves away from the image plane, and exposure of the film image plane commences. After a predetermined time has elapsed, the rear blind moves so as to cover the film image plane. The travel of the front blind and the rear blind is mechanically urged by spring force; the commencement of travel is effected by releasing the holding of the front blind and rear blind.

In the past, the control of these movements was purely mechanical, but in recent years electrical control has become widely used. Similarly to the past, spring force is used for the travel of the front blind and the rear blind, but the commencement of travel is controlled by the passage of current through electromagnets which hold the blinds.

On the other hand, increasing the speed of the shutter to $\frac{1}{8,000}$ second and the like has become an important measure and, in addition, it has become necessary in recent years to increase the strobe synchronization speed to enable pictures to be taken in bright surroundings. For this object, it is necessary to make the travel speed of the front blind and rear blind (termed "blind speed" below) fast and in rapid succession by increasing the aforementioned spring force, and also to control to a narrow width the slit which is formed by the front blind and the rear blind.

In the case of high speed exposure times of $\frac{1}{8,000}$ second, even if the current flow of the electromagnets is controlled with accurate timing, there is a possibility that the desired timing of the respective blinds will not be obtained. This is due to the speed of separation of the holding mechanisms controlled by the electromagnets and the variability of mechanical travel systems in which springs are included. Furthermore, because this kind of phenomenon can only become apparent after the film has been developed, a camera has been proposed having a shutter monitor which can test the exposure time.

The problems of accurate timing of the shutter become greatest when the highest speeds are used. However, there are few opportunities to use high speeds shorter than $\frac{1}{8,000}$ second in normal photography. As a result, timing data were not easily obtained. In addition, not only a test of the shutter time, but also correction of the shutter time due to temperature changes and the like are desired.

Furthermore, in a camera having a shutter measurement device as proposed, there is a problem when the shutter is actuated with the back cover opened. Movement of the shutter vanes may be affected by the wind, etc., and be bent and strike the baseplate or cover plate.

In this kind of camera, when the camera is not used for a long period of time, for example, several days to several months, the first shutter action after this period of non-use is often unstable and the shutter time fluctuates. Accordingly, when a camera has been laid aside for a long period of time, there may be a large deviation in high speed operation in which the exposure time is short. In some instances, the front blind or the rear blind may not even open. In this case, because no test data on the shutter time is obtained, not only can characteristic phenomena not be found in the first shutter activation after a period of non-use, but also the shutter may be determined to be inoperative and the problem thought to be uncorrectable.

SUMMARY OF THE INVENTION

An object of the present invention is to provide a camera having a shutter monitor which can perform a test of the shutter only, independently of photography.

Another object of the present invention is to provide a camera having a shutter monitor which can test the shutter time and in a short period of testing obtain a required shutter time.

A further object of the present invention is to prevent accidents which could lead to damage to the shutter when performing shutter time tests with the back cover of the camera opened.

Yet another object of the present invention is to provide a camera which after having been laid aside for a long period of time, is able to obtain accurate shutter time test data.

The above objects are attained by a camera using a recording medium, including a shutter to limit exposure time of the recording medium, a measurement unit for measuring exposure time of the recording medium based on operation of the shutter and sensing and control components. In one embodiment, the measurement unit is inhibited by a mode selection switch which selects between a test mode in which the measurement unit operates and a normal mode in which the measurement unit is inhibited. In another embodiment, the measurement unit is inhibited from operating if a back cover sensor detects that the back cover is open.

According to the invention, a shutter control unit controls the shutter to limit the exposure time to be greater than a minimum exposure time during an initial use of the recording medium. In the preferred embodiment, photographic film is used as the recording medium and a drive mechanism for winding up the photographic film is included. If the mode selection switch is in the normal mode, the drive mechanism is activated when a shutter operation is completed, but in the test mode, operation of the drive mechanism is inhibited. A sensor for detecting whether the film or other recording medium is loaded may be included. In this case, the test mode may be automatically activated when no film is loaded.

The shutter may be controlled in different ways during testing. In one embodiment, the measurement unit is not activated until after the shutter has been opened and closed at least one time. In another embodiment, a plurality of exposure times are set and the shutter is activated repeatedly for different amounts of exposure in response to a single activation of the shutter release in the test mode. Preferably, operation of the shutter is automatically sequentially changed from a longer exposure time to a shorter exposure time, within the different exposure times set previously.

During normal operation, the shutter is released only a single time per frame of film for each activation of the shutter release.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENTS

Figure 1:
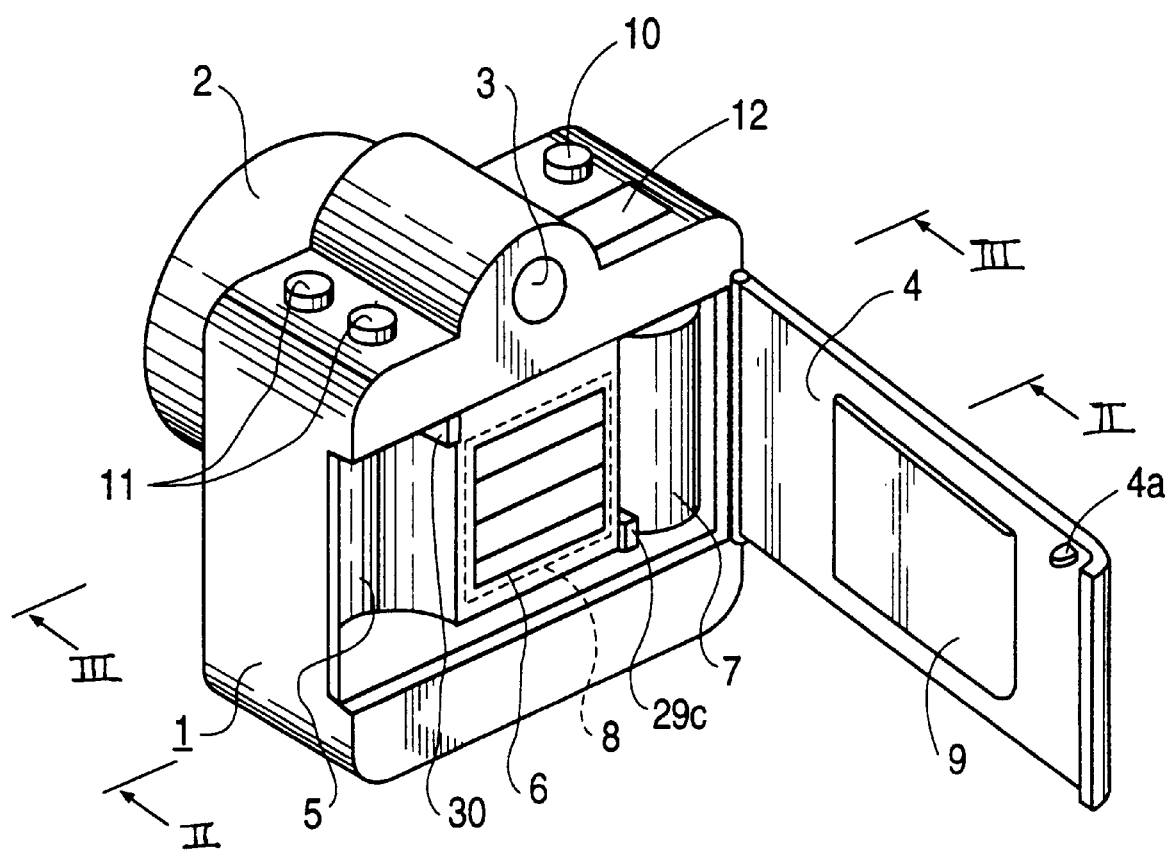
FIG. 1 is a perspective view of an embodiment of a camera having monitoring functions according to the present invention.

FIG. 1 is perspective view of an embodiment of a camera having a shutter monitor according to the present invention. In FIG. 1 the back cover 4 is in the opened state. A film cartridge, not shown in FIG. 1, is loaded into a film cartridge compartment 5, and film withdrawn from the cartridge passes across the front face of an aperture 6, to be wound up on a spool 7. A pressure plate 9 located on the inside of the back cover 4 operates to press the film (not shown in FIG. 1) and keep it flat against the aperture 6. A film detection switch 29c detects whether any film has been loaded into the camera 1.

A back cover open and closed detection switch 30 detects whether the back cover 4 is open. A shutter 8 is arranged on the inside of the aperture 6, and is slightly wider than the aperture 6, as shown by the broken line in FIG. 1. Shutter 8 passes light from the photographic subject via the lens 2 to the film image plane for a predetermined time. The photographer observes the subject through the lens 2 and a viewfinder 3, and depresses a release button 10.

Figure 4:
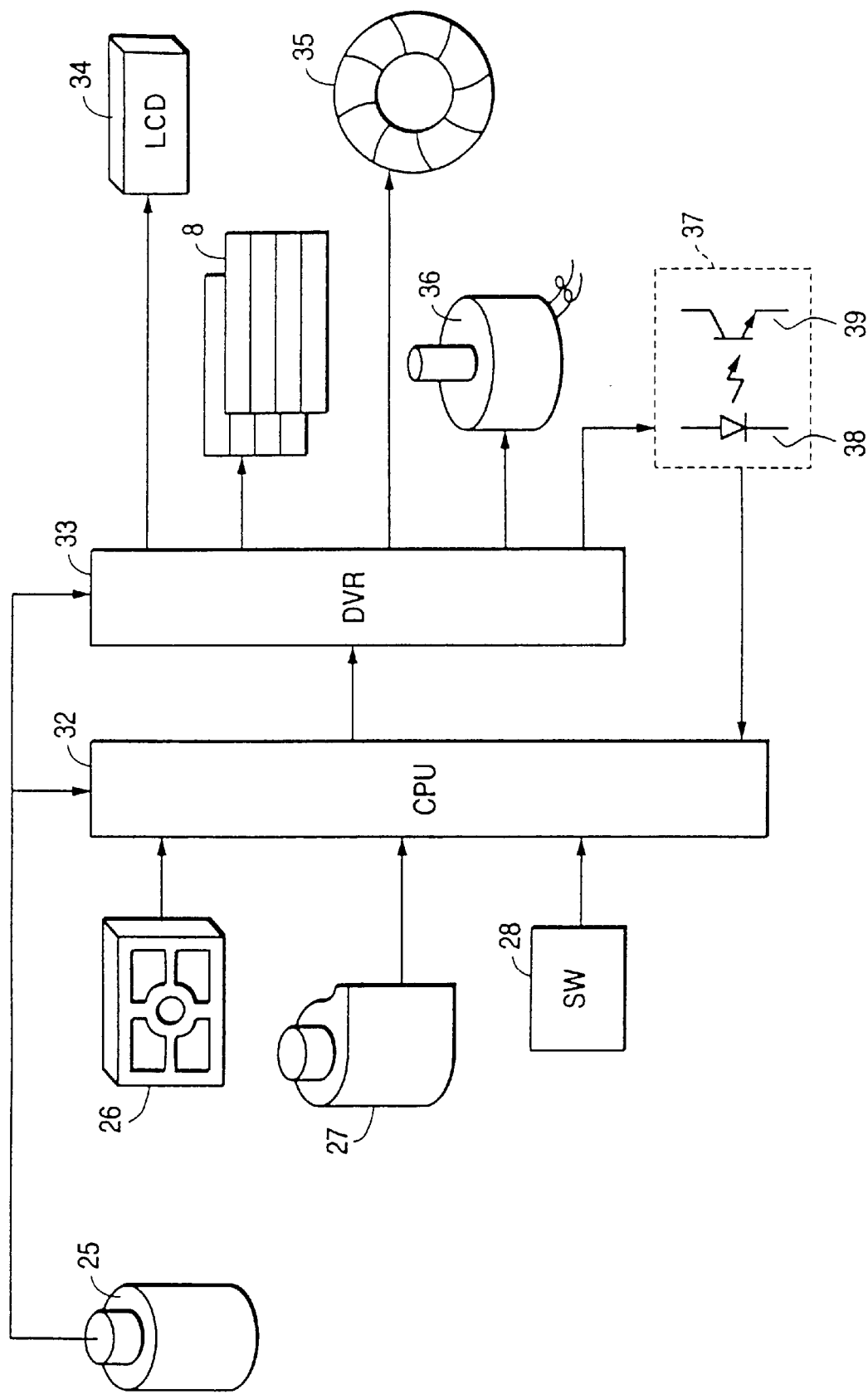
FIG. 4 is a block wiring diagram of an embodiment of a camera having monitoring functions according to the present invention.

Buttons 11 are operating buttons in order to optionally set the operating mode and photographic conditions, etc., of the camera 1, which the photographer can operate while confirming the mode of operation and the like displayed on a display device 12. The display device 12 includes a liquid crystal display (LCD) 34 (FIG. 4). The shutter 8 of the camera 1, film forwarding mechanism, mirror mechanism, stop control mechanism and the like (the latter items not shown in the drawings) operate independently.

Figure 2A:
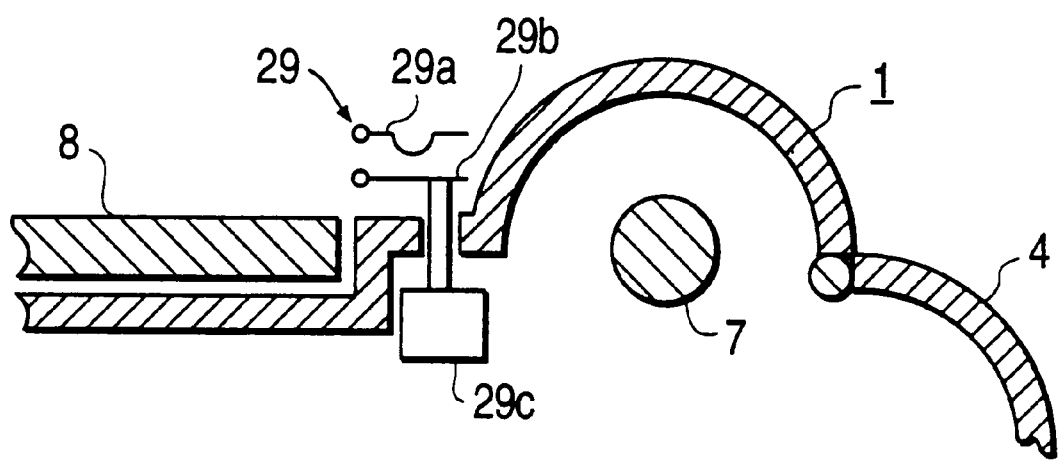
FIGS. 2A and 2B are cross sections of the embodiment illustrated in FIG. 1, taken along line II—II in FIG. 1.
Figure 2B:
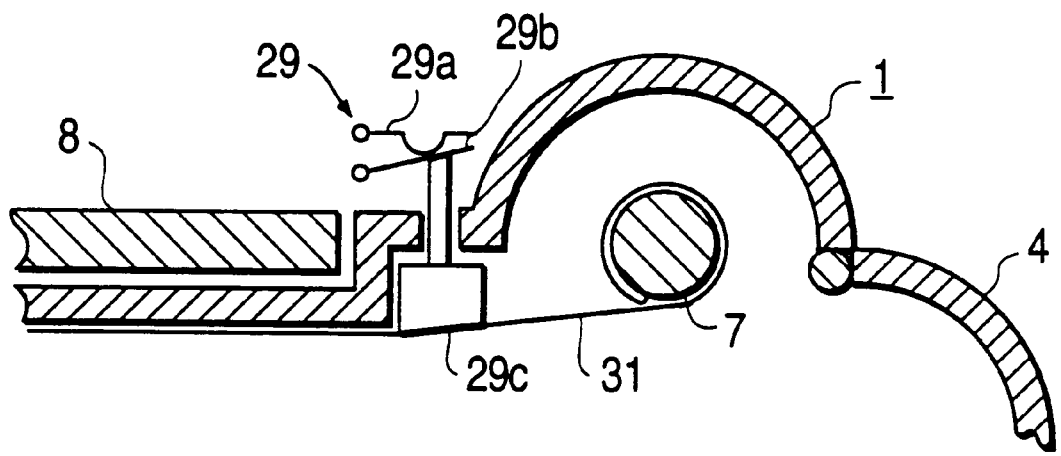

FIGS. 2A and 2B are cross sectional views of FIG. 1 along line II—II in FIG. 1, to illustrate the film detection switch 29 in more detail. In FIG. 2A, when no film is loaded into the camera 1, the contact 29a of the film detection switch 29 is separated from the contact 29b. As shown in FIG. 2B, when film 31 is loaded into the camera 1, the contact 29c of the film detection switch 29 is pressed in an upward direction in FIG. 2B by tension of the film 31 as it is wound. The contacts 29a and 29b conduct electricity and the presence or absence of the film 31 can be detected by the switch 29.

Figure 3A:
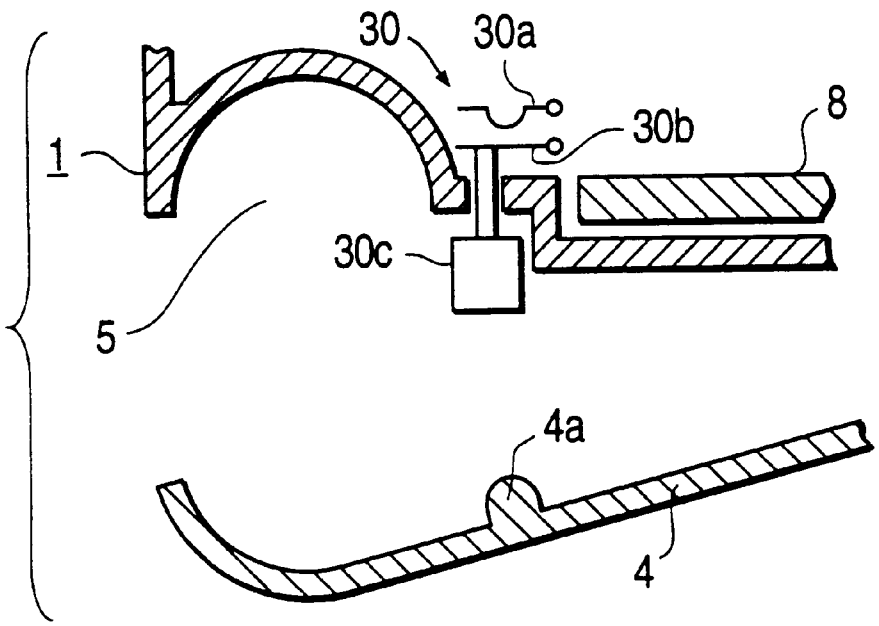
FIGS. 3A and 3B are cross sections of the embodiment illustrated in FIG. 1, taken along line III—III in FIG. 1.
Figure 3B:
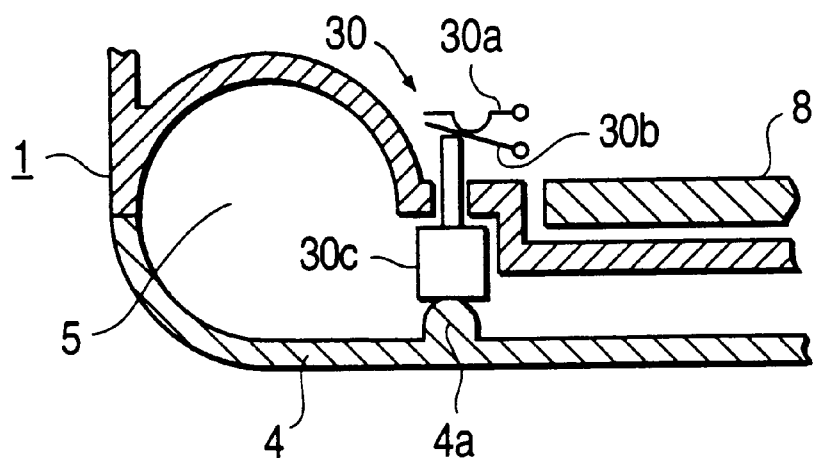

FIGS. 3A and 3B are cross sectional views of FIG. 1 along line III—III in FIG. 1, to illustrate in more detail the back cover open and closed detection switch 30. As shown in FIG. 3A, when the back cover 4 is open the contact 30a and the contact 30b of the back cover open and closed detection switch 30 are separated. As shown in FIG. 3B, when the back cover 4 is closed, a projection 4a of the back cover 4 presses the contact 30c of the back cover open and closed detection switch 30, the contact 30a and the contact 30b conduct electricity, and whether the back cover 4 is open or closed can be detected.

FIG. 4 is a block wiring diagram of an embodiment of a camera according to the present invention. This circuit has a battery 25 as an electric supply, and a CPU 32 effects central control. Input signals to the CPU 32 are as follows.

A photometric device 26 is a sensor which provides measurement means for measuring the luminosity in each of several portions into which the photographic image is divided, to supply value information to the CPU 32. A film sensitivity detection unit 27 reads the code signals provided on the side surface, etc., of the film cartridge loaded into the cartridge compartment 5 (FIG. 1), and inputs film sensitivity information to the CPU 32.

A switch detection unit (SW) 28 provides signals from manual operation switches connected to the release button 10, the setting buttons 11, the film detection switch 29, the back cover open and closed detection switch 30 and timing switches for the sequence state of the camera 1. This information on states of the camera is supplied from the switch detection unit 28 to the CPU 32.

The CPU 32 controls the following actions through driver unit (DVR) 33. On the LCD 34, information relating to the set exposure and operating mode, warning information, etc., is displayed. The CPU 32 controls the action time of the shutter 8 (in detail, the interval between the action of the front blind magnet and rear blind magnet), to determine the exposure time.

The CPU 32, through the driver unit 33, controls the driving of the motors 36, i.e., the shutter motor, the film motor, and the mirror stop motor. These motors respectively control the action of the shutter drive spring, film winding and rewinding, and movement of the mirror and the amount of light passing through the lens 2.

The CPU 32 also controls a shutter blind travel detection unit 37. In detail, as mentioned below, a light emitting diode (LED) 38 is illuminated, and a signal generated by the phototransistor (PTR) 39 is sent to the CPU 32.

Figure 5:
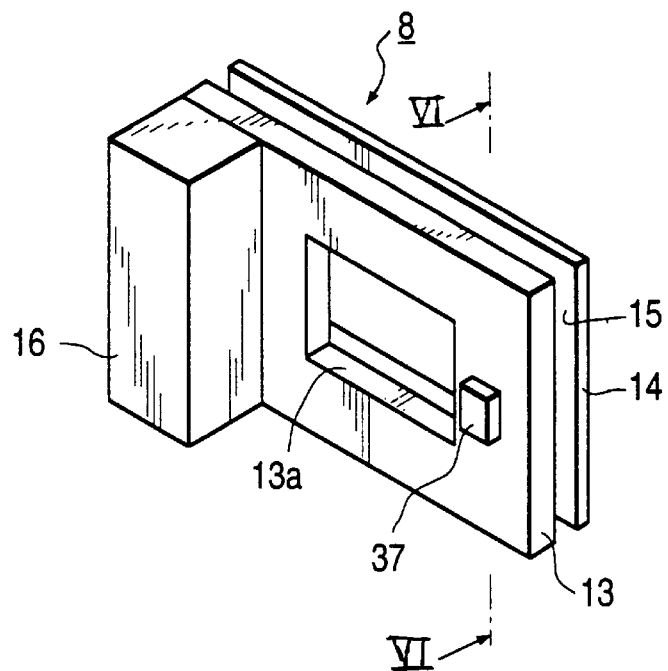
FIG. 5 is a perspective view of an embodiment of a camera having monitoring functions according to the present invention.

FIG. 5 is a perspective view of the shutter 8. A baseplate 13 and a cover plate 14 are located about parallel, having a predetermined spacing, and the vane compartment 15 is formed between them. An opening 13a for exposure is opened in the baseplate 13, and is about equal in position to the aperture 6; moreover, an opening in about the same position, but not shown in the drawing, is opened in the cover plate 14. A shutter mechanism unit 16 comprises a shutter vane drive mechanism containing springs, etc., a timing control mechanism containing electromagnets and the like, and a drive mechanism containing springs for the shutter vanes, etc. The shutter mechanism unit 16 also includes a charge mechanism and the like for charging these mechanisms. The shutter blind travel detection unit 37 is mounted on the baseplate 13 on the opposite side of the opening 13a from the shutter mechanism unit 16.

Figure 6:
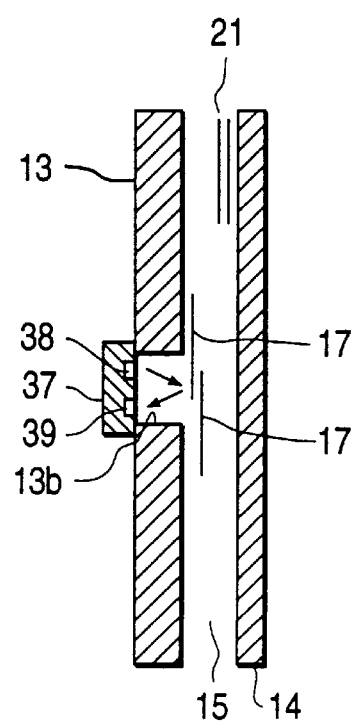
FIG. 6 is a cross sectional view of an embodiment of a camera having a shutter monitor according to the present invention.

FIG. 6 is a cross sectional view of FIG. 5 taken along line VI—VI in FIG. 5. The front vane group 17 and rear vane group 21 are positioned in the vane compartment 15 and are able to move between a position covering the opening 13a and a position opening it. As discussed above, the shutter blind travel detection unit 37 includes LED 38 and PTR 39; a detection orifice 13b is opened in the baseplate 13 at the front side of the shutter blind travel detection unit 37, to detect the front vane group 17 and rear vane group 21. Namely, the light from the LED 38, when the front vane group 17 or rear vane group 21 is present in its position, after reflection from the front vane group 17 or rear vane group 21, is incident on the PTR 39; when these vanes are not present, the light is not incident on the PTR 39. In this manner, the shutter blind travel detection unit 37 detects the front vane group 17 and the rear vane group 21.

FIGS. 7 (7A, 7B, and 7C) and 8 (8A, 8B, and 8C) are plan views to illustrate the action of the front vane group 17 and rear vane group 21.

The front vane group 17 comprises plural vanes including a slit forming vane 17a is supported on two arms 18 which are freely rotatable on pins 19; the two arms 18 are rotatably supported by, and can rotate around, shafts 20 set into the baseplate 13, the whole constituting a linkage mechanism having ring-like motion. The rear vane group 21 comprises plural vanes including a slit forming vane 21a is supported on two arms 22 which are freely rotatable on pins 23; the two arms 22 are rotatably supported by, and can freely rotate around, shafts 24 set into the baseplate 13, the whole constituting a linkage mechanism having ring-like motion. Respective slit edge portions 17b and 21b are formed on the slit forming vanes 17a and 21a.

Figure 7A:
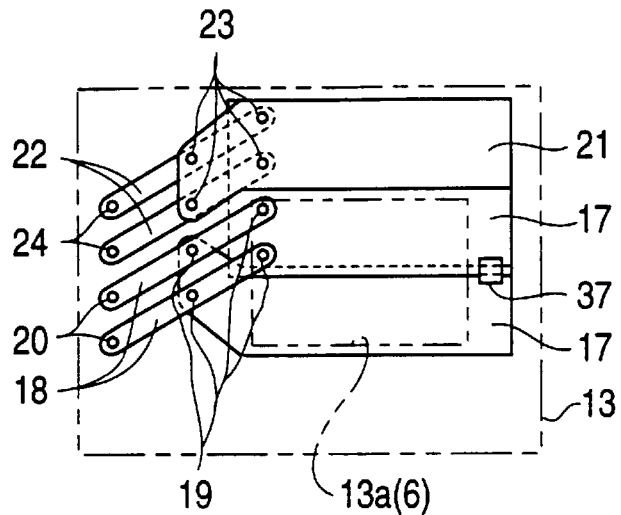
FIGS. 7A—7C are plan views of an embodiment of a camera having a shutter monitor according to the present invention.
Figure 7B:
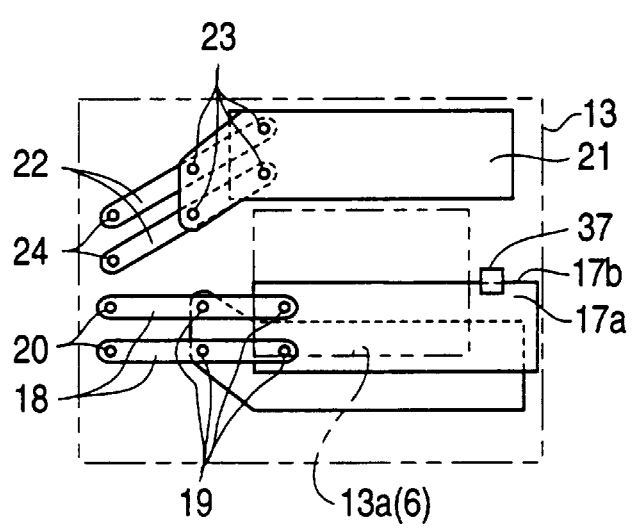
Figure 7C:
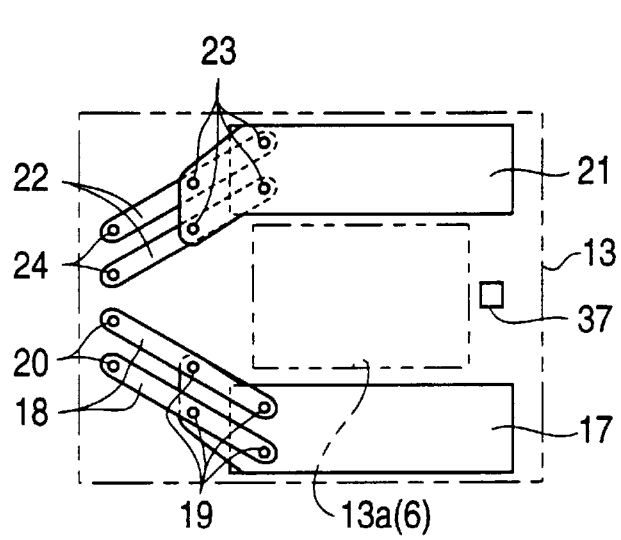

FIG. 7A shows the state on completion of charging; the front vane group 17 is covering the opening 13a, and the rear vane group 21 is folded up, upwards of the opening 13a. In this state, when the front blind magnet (not shown in the drawing) of the shutter mechanism unit 16 is actuated, the front vane group 17 begins to operate and begins to open the opening 13a, and the exposure of the film commences. As shown in FIG. 7B, when the slit edge 17b is in a state coming into the position of the shutter blind travel detection unit 37, because the front vane group 17 passes across the position of the shutter blind travel detection unit 37, the shutter blind travel detection unit 37 reverses its output. The front vane group 17 continues to move further, and reaches the state shown in FIG. 7C in which it has opened the opening 13a, and the operation of the front vane group 17 is completed.

Figure 8A:
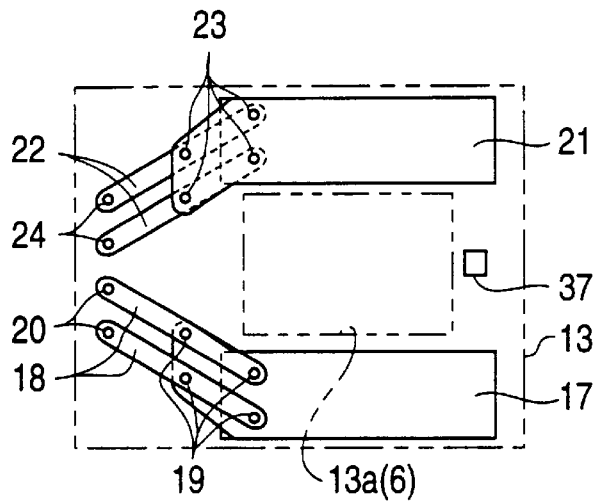
FIGS. 8A—8C are plan views of an embodiment of a camera having a shutter monitor according to the present invention.
Figure 8B:
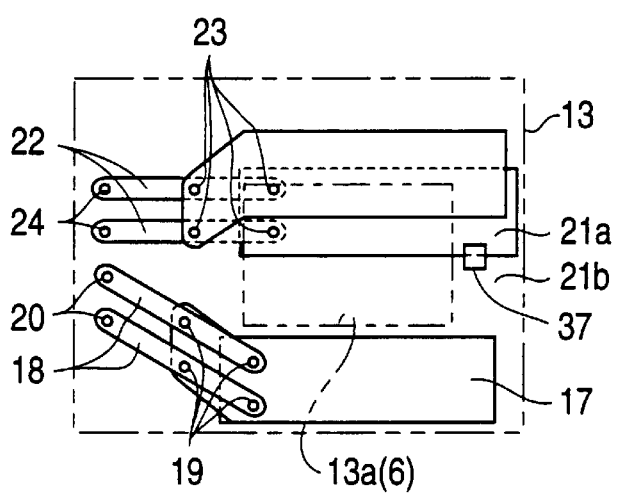
Figure 8C:
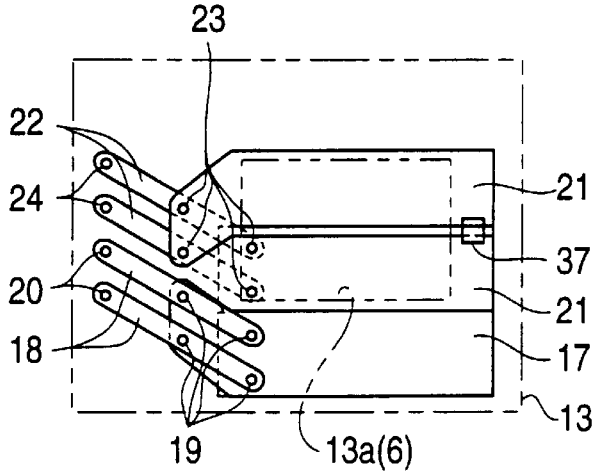

After the exposure time has elapsed after the actuation of the front blind magnet, in the state in FIG. 8A (same as FIG. 7C), when the rear blind magnet (not shown in the drawing) of the shutter mechanism unit 16 is actuated, the operation of the rear vane group 21 commences and begins to close the opening 13a. As shown in FIG. 8B, when the slit edge 21 is in a state coming into the position of the shutter blind travel detection unit 37, because the rear vane group 21 passes across the position of the shutter blind travel detection unit 37, the shutter blind travel detection unit 37 reverses its output; the rear vane group 21 continues to move further, and reaches the state shown in FIG. 8C in which it has covered the opening 13a, and the operation of the rear vane group 21 is completed, and the exposure also ends. After this, the front vane group 17 and rear vane group 21 are charged via the shutter mechanism unit 16 by means of the motor and shutter windup mechanism (not shown in the drawing), and the state returns to that of FIG. 7A.

After the shutter release button 10 is depressed to begin operation of the shutter, when the slit edge 17b of the slit forming vane 17a comes to the position of the shutter blind travel detection unit 37, the output of the PTR 39 reverses from a low level to a high level. To end the exposure, the rear vane group 21 is driven from a position clear of the opening 13a to a position covering it. When the slit edge 21b of slit forming vane 21a comes to the position of the shutter blind travel detection unit 37, the output of the PTR 39 reverses from the high level to a low level.

FIGS. 9A–D are time charts of the action of the shutter 8 as mentioned above, and show the state of travel of the front blind and the rear blind as changed by the ON/OFF timing of the magnets (Mg) used for front blind and rear blind control, and the detection signals of the PTR 39.

When the release button 10 (FIG. 1) is depressed, the current passing through the front blind and rear blind magnets is set ON, and electrical holding of the front and rear blinds replaces the mechanical holding which had been performed before the release button 10 was depressed.

Figure 9A:
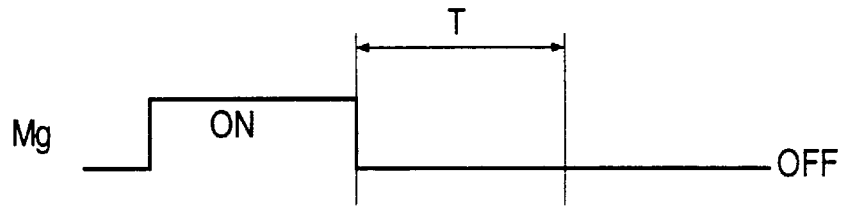
FIGS. 9A—9D are waveform diagrams of an embodiment of a camera having a shutter monitor according to the present invention.
Figure 9B:
Figure 9C:
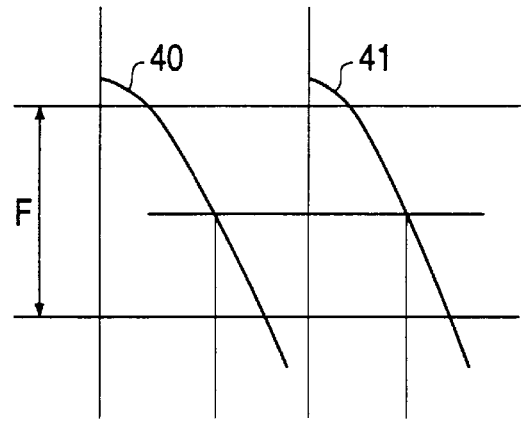
Figure 9D:
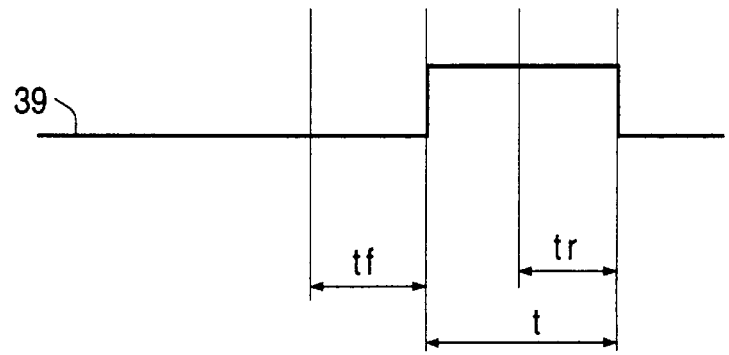

After this, during photography, by means of a mechanism which is not shown in the drawings, the stop of the lens 2 is adjusted and the reflecting mirror (not shown) is raised out of the photographic light path. Next, the front blind magnet is set OFF. As a result, the slit edge 17b of the slit forming vane 17a of the front vane group 17 travels as has been shown by the travel curve 40 in FIG. 9C. Here the region denoted by F shows the vertical opening of the aperture 6. After a time tf has elapsed from setting the front blind magnet OFF, when the slit edge 17b of the front vane group 17 passes across in front of the shutter blind travel detection unit 37, the output of the PTR 39 reverses as shown in FIG. 9D.

Then after a previously set exposure time T has elapsed since the front blind magnet was set OFF, the rear blind magnet is set OFF. As a result, the slit edge 21b of the slit forming vane 21a of the rear vane group 21 travels as indicated by the travel curve 41, to traverse the opening F. Also, after the time tr has elapsed since the rear vane magnet was set OFF, at the time when the slit edge 21b of the rear vane group 21 has passed across the front surface of the shutter blind travel detection unit 37, the output of the PTR 39 reverses, as in FIG. 9D.

If the time t is measured from the rise to the fall of the reversal timing of the PTR 39, obtained as above, the true exposure time which was t can be known. For example, when an exposure control circuit drives the front blind magnet and the rear blind magnet with correct timing, the exposure time T will be correct. In a case where the control time t obtained from the PTR 39 and the exposure time T was different, it can be concluded that there was erroneous operation of the mechanical system.

Furthermore if the times tf and tr are respectively measured, the travel times of the front blind and rear blinds (blind speed) can be found. When the times tf and tr are longer than a standard value, it can be concluded that the blind travel is slow; on the contrary, when they are shorter than a standard value, it can be concluded that the blind travel is too fast, and the determination of exposure irregularities is possible.

Figure 10A:
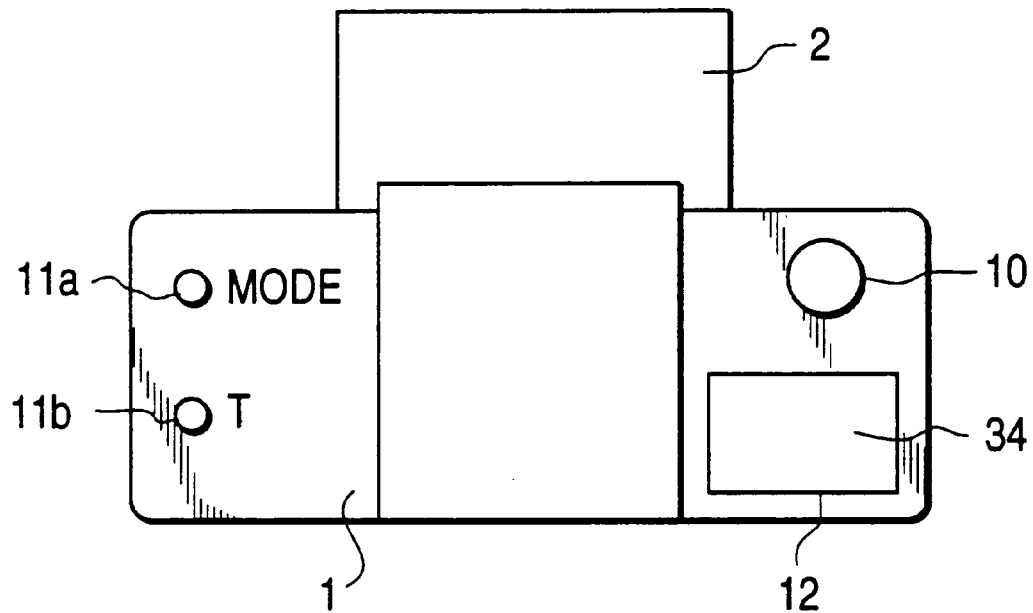
FIGS. 10A and 10B are top views of embodiments of a camera according to the present invention.
Figure 10B:
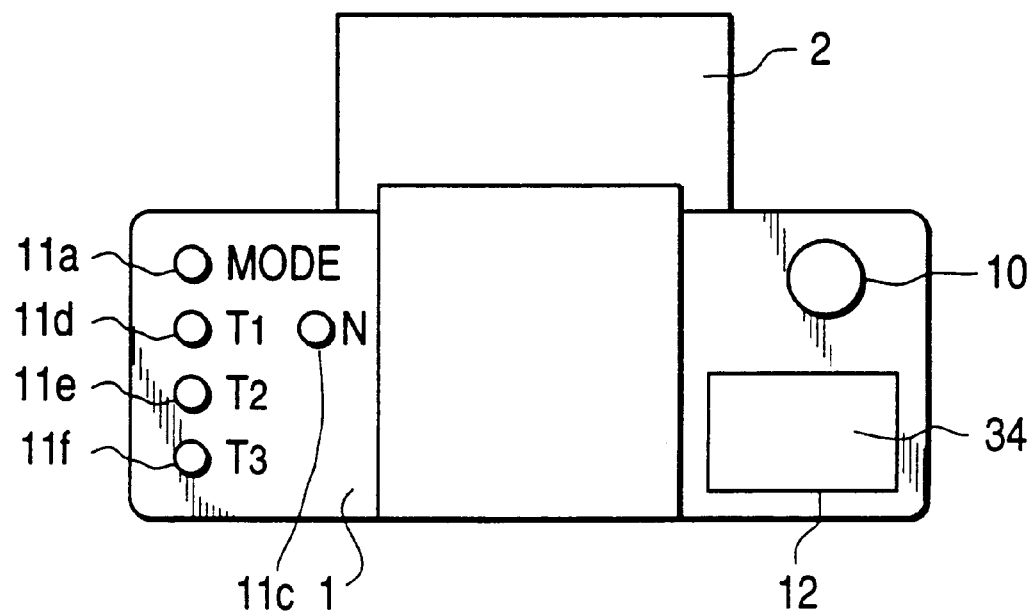

FIGS. 10A and 10B are detailed plan views showing the operating system of the top surface of the camera 1 according to embodiments of the present invention. In a first embodiment illustrated in FIG. 10A, the setting buttons 11 as shown in FIG. 1 include a mode selection switch 11a for selecting between a normal photographic mode and a shutter test mode. In the test mode, the shutter time T is set by means of a switch 11b.

In FIG. 10B, the setting buttons 11 include the mode selection switch 11a for selecting between the normal photographic mode and the shutter test mode and three switches used in the test mode. T1 switch 11d, T2 switch 11e and T3 switch 11f set the shutter times. Any of these switches which are depressed are ON and those which are not depressed are OFF.

The camera 1 is able to change between a normal mode performing normal photography similar to that of a prior art camera and a test mode in which a test of the shutter alone is performed. As shown in FIGS. 10A and 10B, when the mode switch 11a is not depressed, the mode selected is the normal mode, and when the mode switch 11a is depressed, the camera 1 is in the test mode.

Figure 11:
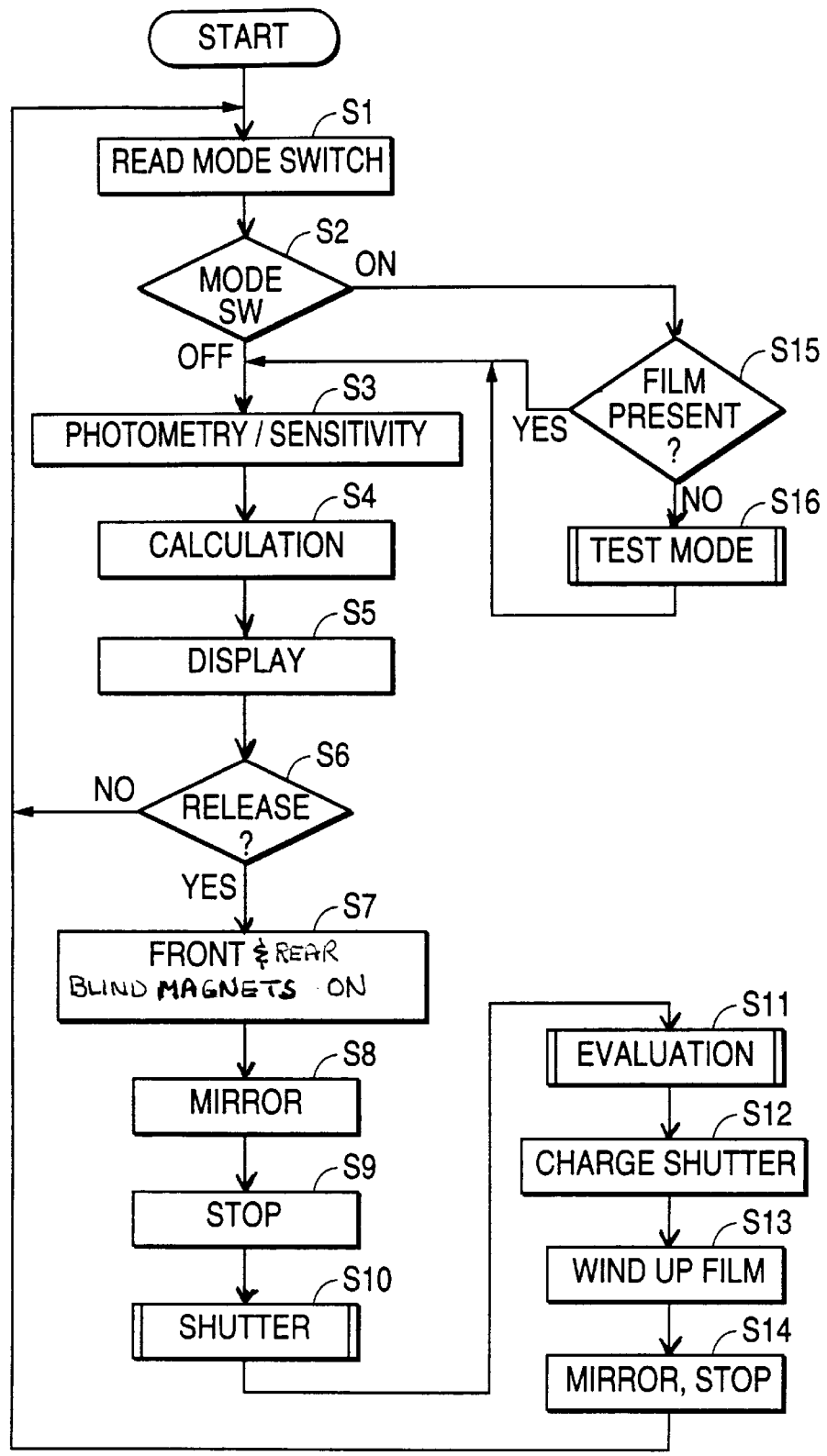
FIGS. 11—22 are flow charts of embodiments of a camera having a shutter monitor according to the present invention.

FIG. 11 is a flow chart to illustrate the processing routine of a camera according to an embodiment of the present invention by means of the CPU 32 shown in FIG. 4. This routine is repeatedly performed when electric power is supplied.

When the processing routine starts, in step S1 the state of the mode switch 11a is read via the switch detection unit 28. In a first embodiment, the mode is tested in step S2 and only if it is ON, namely depressed, the routine proceeds from step S2 to step S15. If the mode switch 11a is OFF, namely is not depressed, the routine proceeds from step S2 to step S3. In a second embodiment, step S15 is performed regardless of whether the mode switch is ON or OFF.

In step S15, the state of the film detection switch 29 is read via the switch detection unit 28. If film is loaded, the test mode of the following step S16 is not performed, and the routine proceeds to S3. If the film is not loaded, the routine proceeds to step S16. In step S16, the test mode routine, which performs a test of the shutter, is carried out prior to proceeding to step S3. Details for two embodiments of the test mode routine are described below with respect to FIGS. 15, 16A and 16B.

In step S3, photometric signals and sensitivity signals are respectively obtained from photometric unit 26 and sensitivity detection unit 27. In step S4, the photometric signals and sensitivity signals are operated on, and the appropriate exposure conditions of shutter time and stop value are calculated. In step S5, the exposure conditions and the like which have been found above are displayed on the LCD 34.

In step S6, it is determined via the switch detection unit 28 whether or not the release button 10 has been depressed. In the case that the release button has not been depressed, the routine returns to step S1 and the above treatment is repeated. In the case that the release button 10 has been depressed, the routine proceeds to step S7.

In step S7, because the instruction for an exposure has been given by depressing the release button 10, as described in FIG. 7, firstly the front blind magnet and the rear blind magnet are set ON. In step S8, the reflecting mirror (not shown) is raised, and is moved out of the photographic light path. In step S9, the aperture of the stop 35 is controlled to be a predetermined value. In step S10, the shutter routine to control the exposure of the film, opening and closing the shutter 8, and the shutter blind travel detection routine by means of the shutter blind travel detection unit 37, are carried out. Details of the shutter routine and the shutter blind travel detection routine are described below with reference to FIGS. 12 and 13.

In step S11, evaluation is performed of the time data detected by the shutter blind travel detection unit 37. Details of the time data evaluation are described in FIG. 14. In step S12, because the action of exposure has been completed, the shutter motor 36a is caused to revolve normally, and charging of the shutter 8 is performed. In step S13, the film motor of motors 36 is caused to revolve normally, and forwarding of the film is performed. In step S14, the mirror motor of motors 36 is caused to revolve normally, and the mirror is moved down and resetting of the stop is performed. After this, the routine returns to step S1, and the process described above is repeated.

Figure 12:
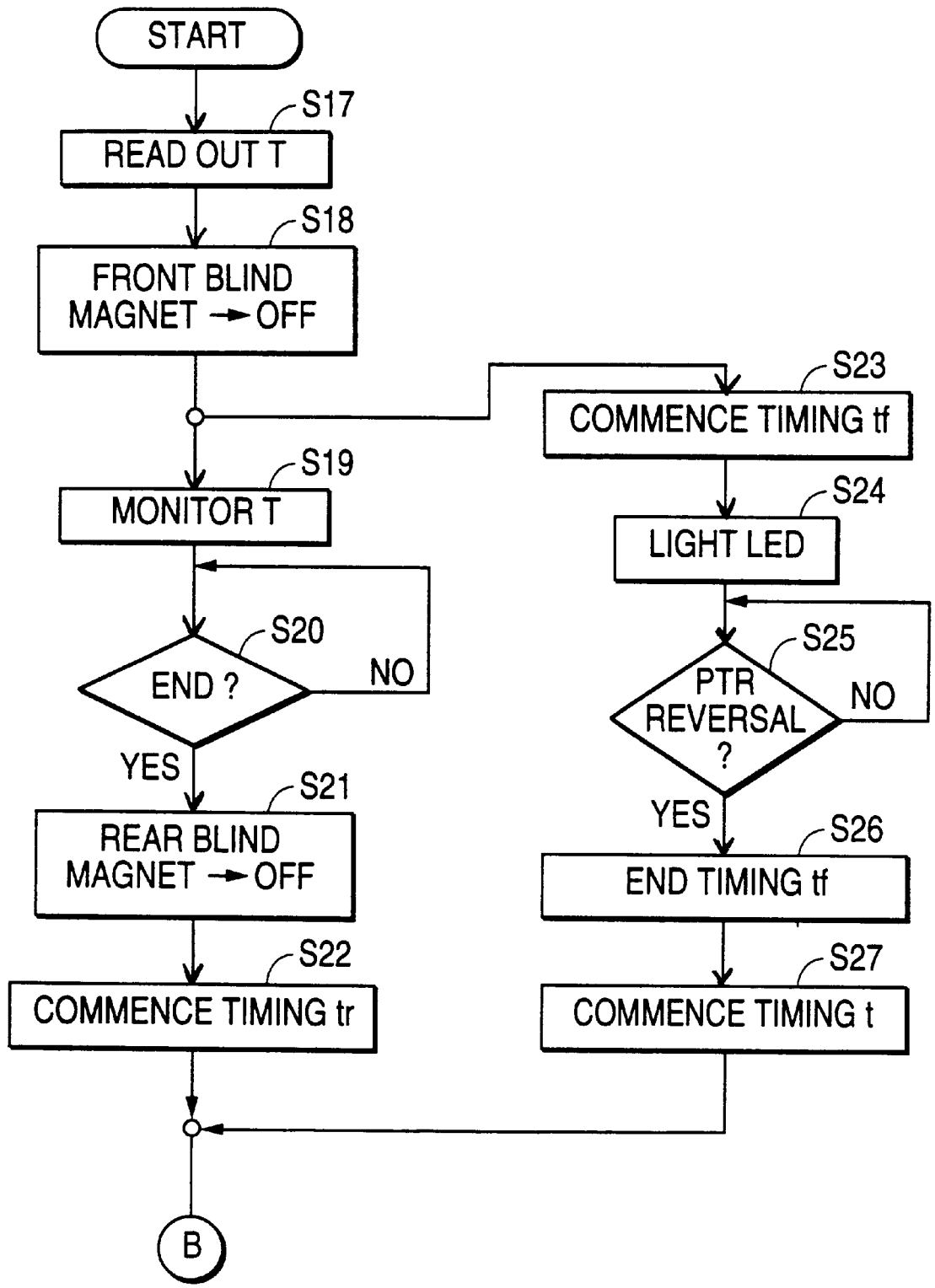
Figure 13:
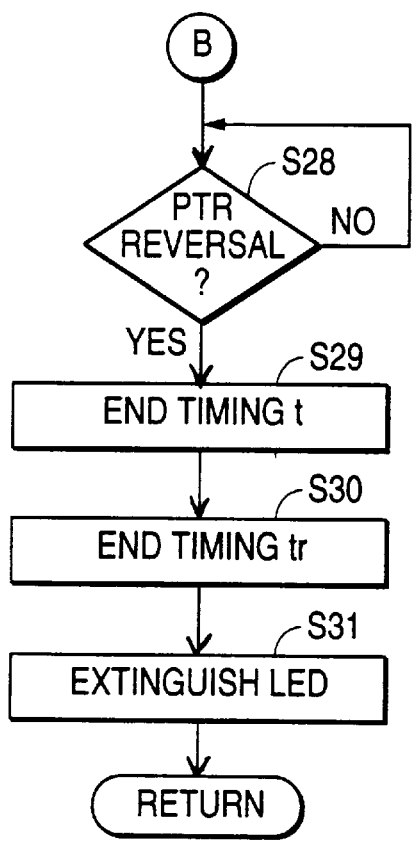

FIGS. 12 and 13 are flow charts illustrating the details of the shutter routine of step S10. In step S17, the shutter time T established in step S4 is read. In step S18, the passage of current to the front shutter blind is ended, and the travel of the front vane group 17 is begun. After this, the process from step S19 to step S22 is performed simultaneously with the process from step S23 to step S27. To clarify the description, the shutter time T in the present embodiment is exemplified by the case in which it is sufficiently longer than the travel time of the front vane group 17 and the rear vane group 21.

In one of the processes simultaneously carried out, the timing of the shutter time T is started in step S19. In step S20, the completion of the shutter time T is awaited. In step S21, because the shutter time T has elapsed, the current flow to the rear blind magnet ends, and the travel of the rear vane group 21 is begun. In step S22, the measurement of time tr is started, and step S28 (FIG. 13) is reached.

In the other process simultaneously carried out, the measurement of time tf in step S23 is started simultaneously with step S19. In step S24, the light emitting diode 38 is illuminated. In step S25, the reversal is awaited of the output of the phototransistor (PTR) 39 due to the slit edge 17b of the front vane group 17 passing across. In step S26, the measurement of time tf is completed. In step S27, the timing of the monitor time t is begun, and step S28 (FIG. 13) is reached.

In step S28 (FIG. 13), the reversal is awaited of the output of the phototransistor (PTR) 39 due to the slit edge 21b of the rear vane group 21 passing across. In step S29, the timing of the monitor time t ends. In step S30, the measurement of time tr ends. In step S31, because the measurements have been completed, the light emitting diode 38 is extinguished, and the routine returns to step S11 of FIG. 11.

Figure 14:
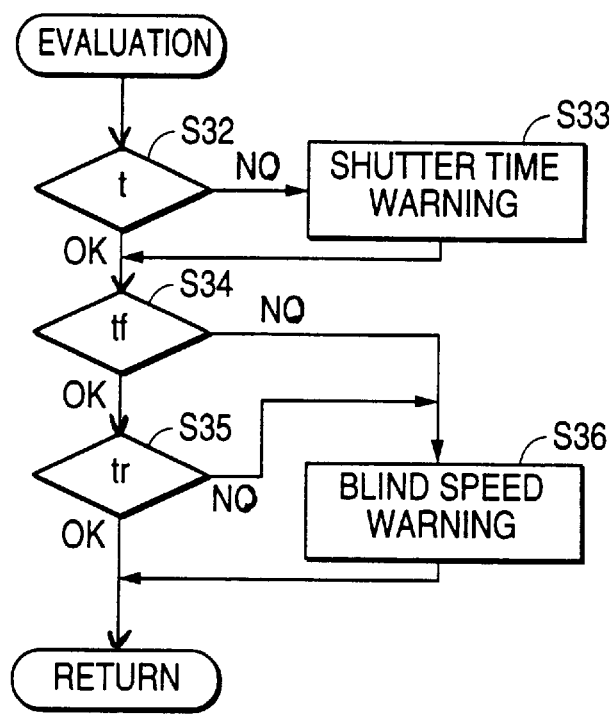

FIG. 14 is a flow chart of the evaluation of the time data in step S11 of FIG. 11. When the routine begins, it is determined in step S32 whether the monitor time t is within the previously set tolerance time range with respect to the shutter time T. In the case that it is within the tolerance time range, the routine proceeds to step S34. In the case that it has deviated from the tolerance time range, a time warning is performed (step S33), and after this the routine proceeds to step S34. This time warning is to announce that the predetermined value of the exposure time has not been satisfied.

In step S34, it is determined whether the travel time tf of the front vane group 17 is within the predetermined time range. In the case that it is within the predetermined time range, the routine proceeds to step S35. In the case that it deviated from the predetermined time range, a warning to this effect is performed (step S36), after which the routine proceeds to step S12 (FIG. 11). In step S35, it is determined whether the travel time tr of the rear vane group 21 is within the predetermined tolerance range. In the case that it is within the predetermined time range, the routine proceeds to step S12 (FIG. 11). In the case that it deviated from the predetermined time range, a warning to this effect is performed in step S36, after which the routine proceeds to step S12 (FIG. 11).

Figure 15:
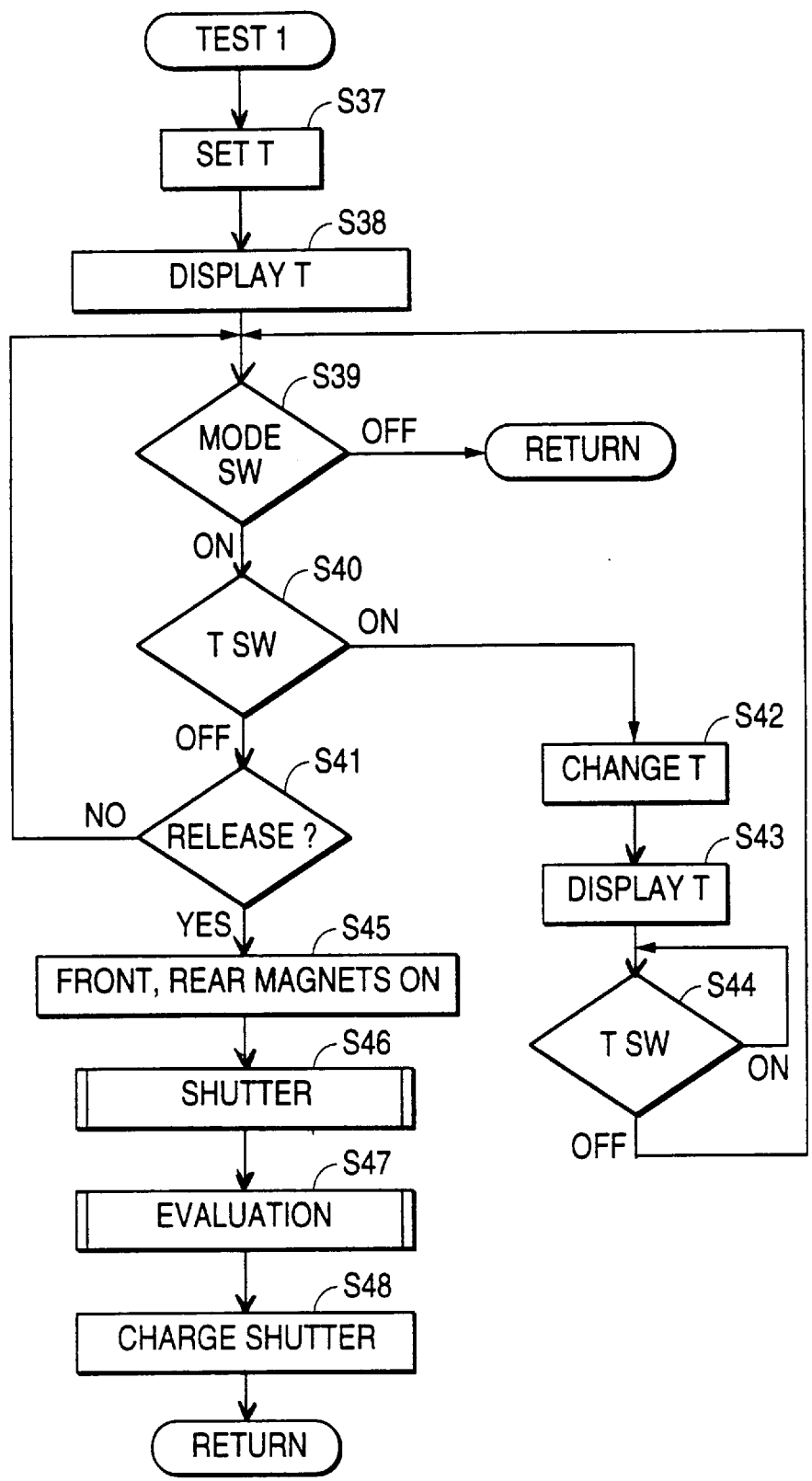

FIG. 15 is a flow chart illustrating details of the first embodiment of the test mode routine of step S16 in FIG. 11. In this first embodiment, there is one type of shutter time test and it is performed only once.

In step S37, the shutter time T is set, for example, the highest speed time which was previously decided for test use. The shutter time T set in step S37 is displayed on the LCD 34 in step S38.

In step S39, the state of the mode switch 11 is determined via the switch detection unit 2. In the case that the mode switch 11a is ON, the routine proceeds to step S40; if it is OFF, the detection mode is discontinued and the routine returns to step S3 of FIG. 11.

In step S40, the state of the T switch 11b is determined via the switch detection unit 28. If the T switch 11b is ON, the routine proceeds to step S42; if the T switch 11b is OFF, the routine proceeds to step S41. In step S41, the state of the release button 10 is determined via the switch detection unit 28. If the release button 10 is not depressed, the routine returns to step S40; if it is depressed, the routine proceeds to step S45 which is described below.

If the T switch 11b has been determined to be ON in step S40, the shutter time T which was set in step S37 is changed in step S42. The method of change may be to increase the shutter time T, for example by 1 Ev, each time the ON state of the T switch is detected. If the sequence of shutter times reaches the low speed limit, the shutter time T is set to the highest speed shutter time. Next, proceeding to step S43, the shutter time T which was changed in step S42 is displayed on the LCD 34. In step S44, the state of the T switch 11b is determined via the switch detection means 28. If it is ON, the routine repeats step S44 until the T switch 11b is OFF, at which time the routine returns to step S40.

In step S45, because the release button 10 is in the depressed state, as described in FIG. 8, firstly the front blind magnet and the rear blind magnet are set ON. In step S46, the shutter routine to control the exposure to the film, opening and closing the shutter 8 as was described in FIGS. 12 and 13, and the shutter blind travel detection routine by means of the shutter blind travel detection unit 37, are performed. Next, in step S47, the evaluation routine as described in FIG. 14 is performed. Furthermore, in step S48, because the exposure action has ended, charging of the shutter is performed, and the routine proceeds to step S3 (FIG. 11).

In carrying out the test at the test shutter time T set in step S37, without the T switch 11b depressed even once, the release button 10 may be depressed. For the test shutter time T to be changed by a number of steps, the T switch 11b may be depressed the desired number of times. For example, to change it by three steps, the T switch 11b is pressed three times.

Furthermore, in the case of a process routine in which the test shutter time T is not changed, step S40 and steps S42–S44 may be omitted. In this case, the T switch 11b is unnecessary.

Figure 16A:
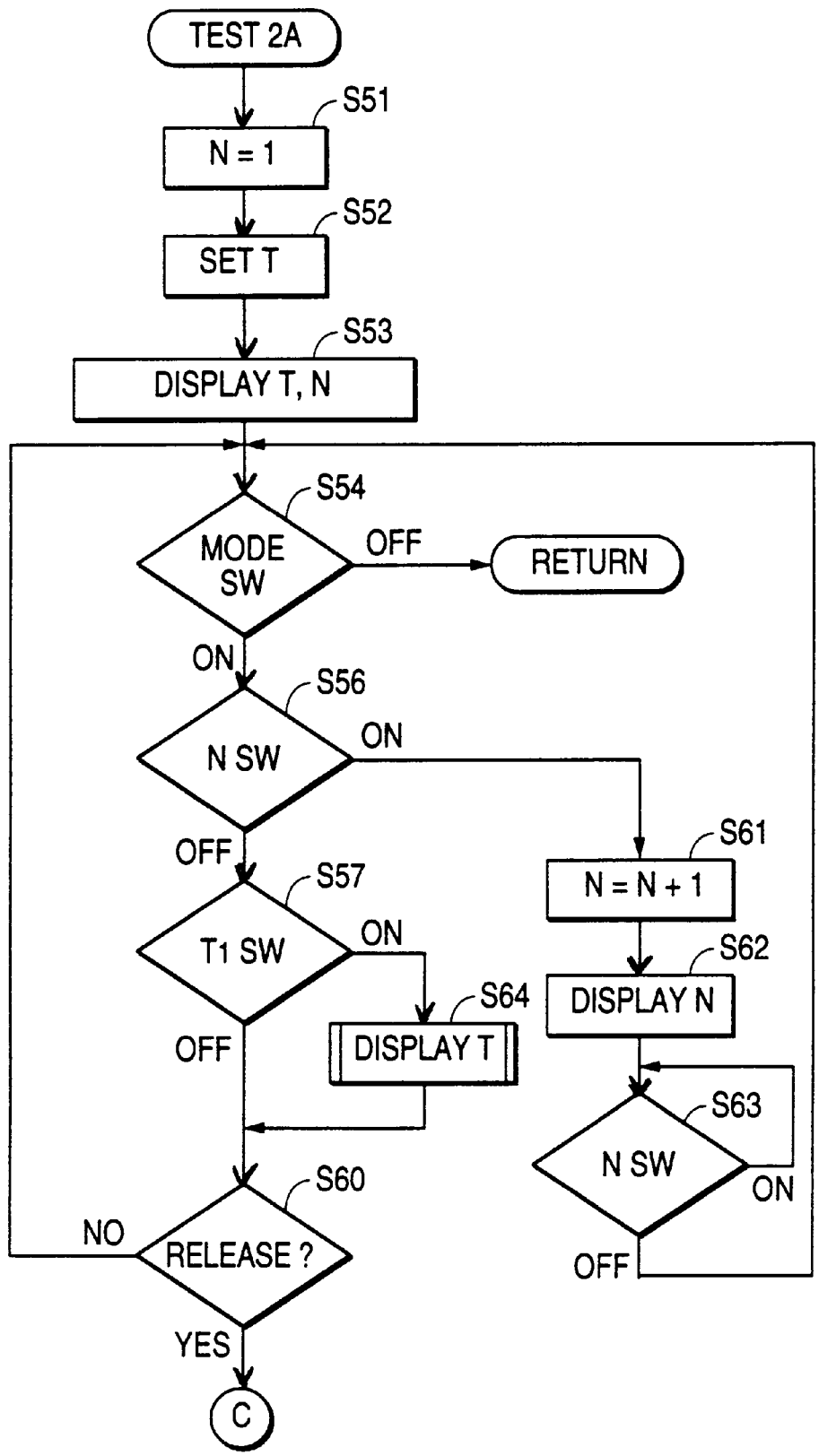
Figure 17:
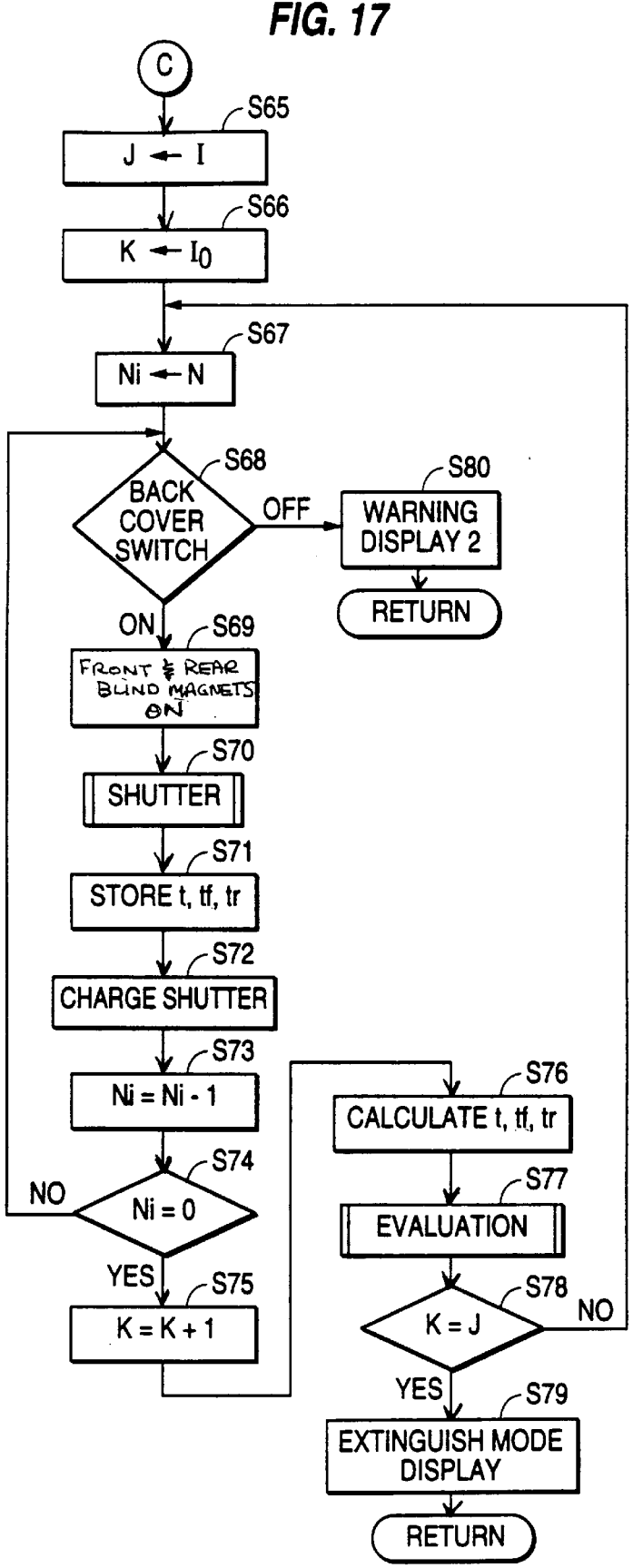

FIGS. 16A and 17 are flow charts illustrating a second embodiment of the test mode routine in step S16 of FIG. 11. In this embodiment, it is possible to have multiple settings of the shutter times to be tested, it is possible to set a number of test times, and the tests can be automatically carried out under the conditions which have been set.

When the test mode routine (TEST 2A) is started, in step S51, the number of test times N is set to one. In step S52, shutter times tested are set. It will be assumed that the number of shutter times tested will be two, Ta and Tb, stored in the 10 address and 10+1 address of the T memory (not shown) in the CPU 32.

In step S53, the shutter time tested T and the number of times of testing N are displayed on the LCD 34. In step S55, the state of the N switch 11c is determined via the switch detection unit 28; if the N switch 11c is ON, the routine proceeds to step S61, and if the N switch 11c is OFF, it proceeds to step S57.

In step S54, the state of the mode switch 11a is determined via the switch detection unit 28. In the case that the mode switch 11a is ON, the routine proceeds to step S56; in the case that it is OFF, the test is discontinued and the routine returns to step S3 of FIG. 11.

In the case that the N switch has been determined to be ON in step S56, in step S61 the number of test times N is incremented, and in step S62 the new number of test times N is displayed on the LCD 34. In step S63, the state of the N switch 11c is determined via the switch detection unit 28; if the N switch 11c is ON, the step S63 is repeated until the N switch 11c becomes OFF, at which time the routine returns to step S54.

In the case that the N switch 11c has been determined to be OFF in step S56, in step S57 the state of the T1 switch 11d is determined via the switch detection unit 28. If the T1 switch 11d is ON, the routine proceeds to step S64, and if the T1 switch 11d is OFF, the routine proceeds to step S60.

In the case that the T1 switch 11d was determined to be ON in step S57, step S64 is performed to change the plural shutter times T to be tested, which were set in step S52. The process details in step S64 are described with reference to FIG. 19. The result of the process in step S64 is that shutter times tested T (for example, Tc, Td, . . . ) are set in succession in the I-1 address from the 10 address of the T memory in the CPU 32.

After the process in step S64 is completed, or without performing that process if the T1 switch 11d was determined to be OFF in step S57, the state of the release button 10 is determined via the switch detection unit 28 in step S60. When the release button 10 is not depressed, the routine returns to step S54. When the release button 10 has been depressed, the routine proceeds to step S65 (FIG. 17).

Figure 16B:
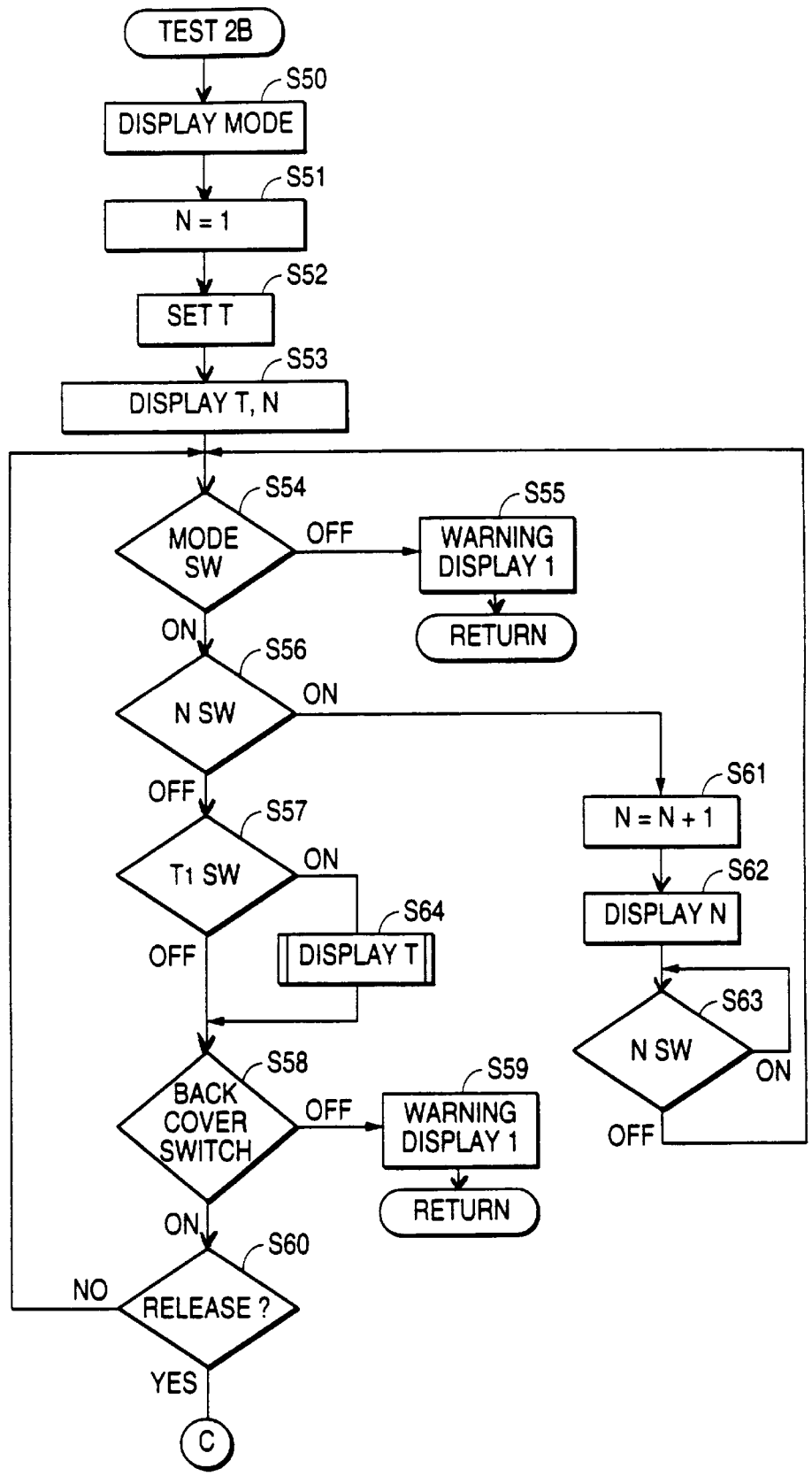

FIGS. 16B and 17 are flow charts illustrating details of a variation of the second embodiment of the test mode process routine of step S16 of FIG. 11. As before, in this embodiment, it is possible to have multiple settings of the shutter times to be tested, it is possible to set a number of test times, and the tests can be automatically carried out under the conditions which have been set.

With reference to FIG. 10B, in this variation of the second embodiment, the number of times tested is set by means of the N switch 11c, after the test mode has been set and the shutter times have been set by means of the T1 switch 11d, the T3 switch 11f and the T2 switch 11e.

Figure 23A:
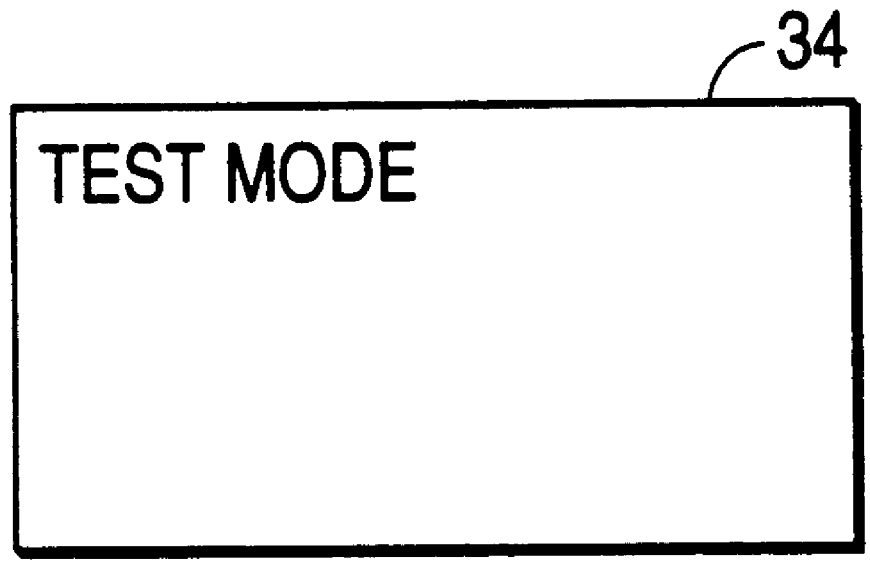
FIGS. 23A and 23B are plan views of a camera shutter monitor according to the present invention.

When the test mode routine (TEST 2B) starts, in step S50 the setting of test mode is displayed on the LCD 34, for example, as in FIG. 23A. Namely, the legend "TEST MODE" is displayed on the left-hand portion of the LCD 34. In step S51, the number of tests, N, is set to 1 time. In step S52, plural shutter times to be tested are set. For the sake of illustration, the shutter times are taken as two, Ta and Tb; they are respectively stored in the 10 address and 10+1 address of the T memory of the CPU 32. In step S53, the shutter time tested T and the number of times of testing N are displayed on the LCD 34.

In step S54, via the switch detection unit 28, it is determined whether the mode switch 11a has been depressed. If the mode switch 11a is ON, namely it has been depressed, the routine proceeds to step S56; if it is OFF, namely has not been depressed, the routine proceeds to step S55. In step S55, because the mode switch 11a has not been depressed, the legend "END TEST MODE" is displayed, as in FIG. 23B, in the left-hand top portion of the LCD 34 showing that test mode has been left and the routine returns to step S3 of FIG. 11.

In step S56, the state of the N switch 11c is determined via the switch detection unit 28. If the N switch 11c is ON, namely depressed, the routine proceeds to step S61, and if the N switch 11c is OFF, namely has not been depressed, it proceeds to step S57.

When the N switch 11c is determined to be ON, namely depressed, in step 56, the number of times N of testing is incremented by 1 time in step S61. In step S62, the new number N of tests is displayed on the LCD 34. In step S63, the state of the N switch 11c is determined via the switch detection unit 28. If the N switch 11c is ON, namely has been depressed, this process is repeated; if it is OFF, namely not depressed, the routine returns to step S54.

In step S57, the state of the T1 switch is determined, via the switch detection unit 28. If it is ON, namely has been depressed, the routine proceeds to step S64, and if it is OFF, namely not depressed, the routine proceeds to step S58.

When the T1 switch 11d is found in step S57 to have been depressed, in step S64 a process to change the kinds of shutter times T set in step S52 is carried out. The process details of changing the set shutter times T tested are described below with reference to FIG. 19. As a result of the process in step S64, changed shutter times tested T (for example, Tc, Td, . . . ) are set in succession in the I-1 address from the 10 address of the T memory in the CPU 32.

In step S58, the state of the back cover open and closed detection switch 30 is determined via the switch detection unit 28. If it is OFF, namely open, the routine proceeds to step S59 and the characters of "END TEST MODE" are displayed as in FIG. 23B in the left-hand upper portion of the LCD 34, showing that test mode was left, Then, the routine returns to step S3 of FIG. 11.

In step S60 the state of the release button 10 is determined via the switch detection unit 28. In the case that it is not depressed, the routine returns to step S54. If it is depressed, the routine proceeds to step S65 (FIG. 17).

Both variations of the second embodiment of the test process (step S16) continue with step S65 in FIG. 17. In step S65, shutter times T to be tested are set and are stored in the T memory in the CPU 32 with the address information being stored at J. In step S66, the plural shutter times T to be tested are set and are stored at the initial address K of the T memory of the CPU 32. In step S67, the number N of tests is stored in a counter Ni. In step S68, the state of the back cover open and closed detection switch 30 is determined via the switch detection unit 28. If it is ON, namely closed, the routine proceeds to step S69; if OFF, namely open, the routine proceeds to step S80.

Figure 23B:
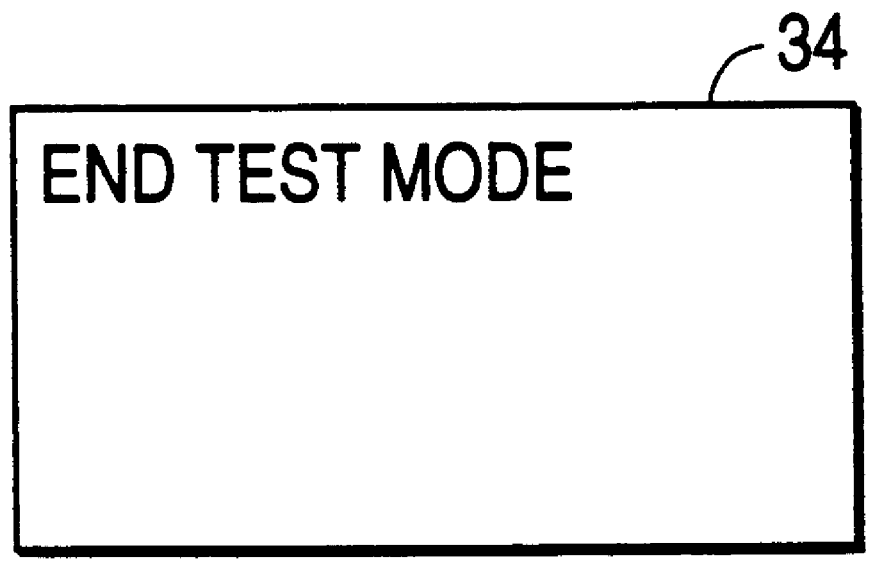

In step S80, because it was determined in step S68 that the back cover was open, the test is discontinued, and the characters "END TEST MODE" are displayed as in FIG. 23B in the upper left portion of the LCD 34, showing that the test mode has been discontinued. Then, the routine returns to step S3 of FIG. 11.

In step S69, as described above with reference to FIG. 7, the front blind and rear blind magnets are set ON. In step S70, the shutter routine to control the exposure time by opening and closing the shutter 8, described above with reference to FIG. 12 and FIG. 13, and the shutter blind travel detection routine by means of the shutter blind travel detection unit 37, are carried out. Also, the shutter test time T stored at the K address of the T memory of the CPU 32 is read.

In step S71, the monitor time t and measurement times tf and tr, obtained by carrying out step S70 one time, are stored. Because the exposure action thereby ends, charging of the shutter 8 is performed in step S72. In step S73, the counter Ni is decremented by 1. In step S74, it is determined whether the testing has been performed up to the number of times set. In the case that the number of test times has not ended, the routine returns to step S68, and steps S68–S73 are repeated; the monitor time t, measurement time tf, and measurement time tr, obtained on performing each exposure action, are stored. At the time that the previously set number of tests has ended, the routine proceeds to step S75.

In step S75, because a test of one test shutter time has been completed, the address of the T memory in the CPU 32 is increased by 1. In step S76, time data are calculated, as required, of the monitor time t, measurement time tf, and measurement time tr stored in the T memory in step S71. In step S77, the evaluation routine described with reference to FIG. 14 evaluates the monitor time t, the measurement time tf, and the measurement time tr calculated in step S76. In step S78, it is determined whether all the test shutter times which were set have been tested. If testing of the shutter times is not complete, the routine returns to step S67, and repeats the process of steps S67–S77, until all the N times of testing of the respective sequence of test times stored in the T memory have been performed. On completion of testing, the routine proceeds to step S79.

In step S79, the test mode display of FIG. 23A is extinguished, showing the photographer that the tests according to the test mode have ended, and the routine returns to step S3 of FIG. 11.

At this time, the data of the Kth address of the T memory are the last test shutter time to be tested. Moreover because Ni is the remaining number of test times remaining for this test shutter time, by displaying these data on the LCD 34 it can be known where the discontinuance occurred.

Figure 19:
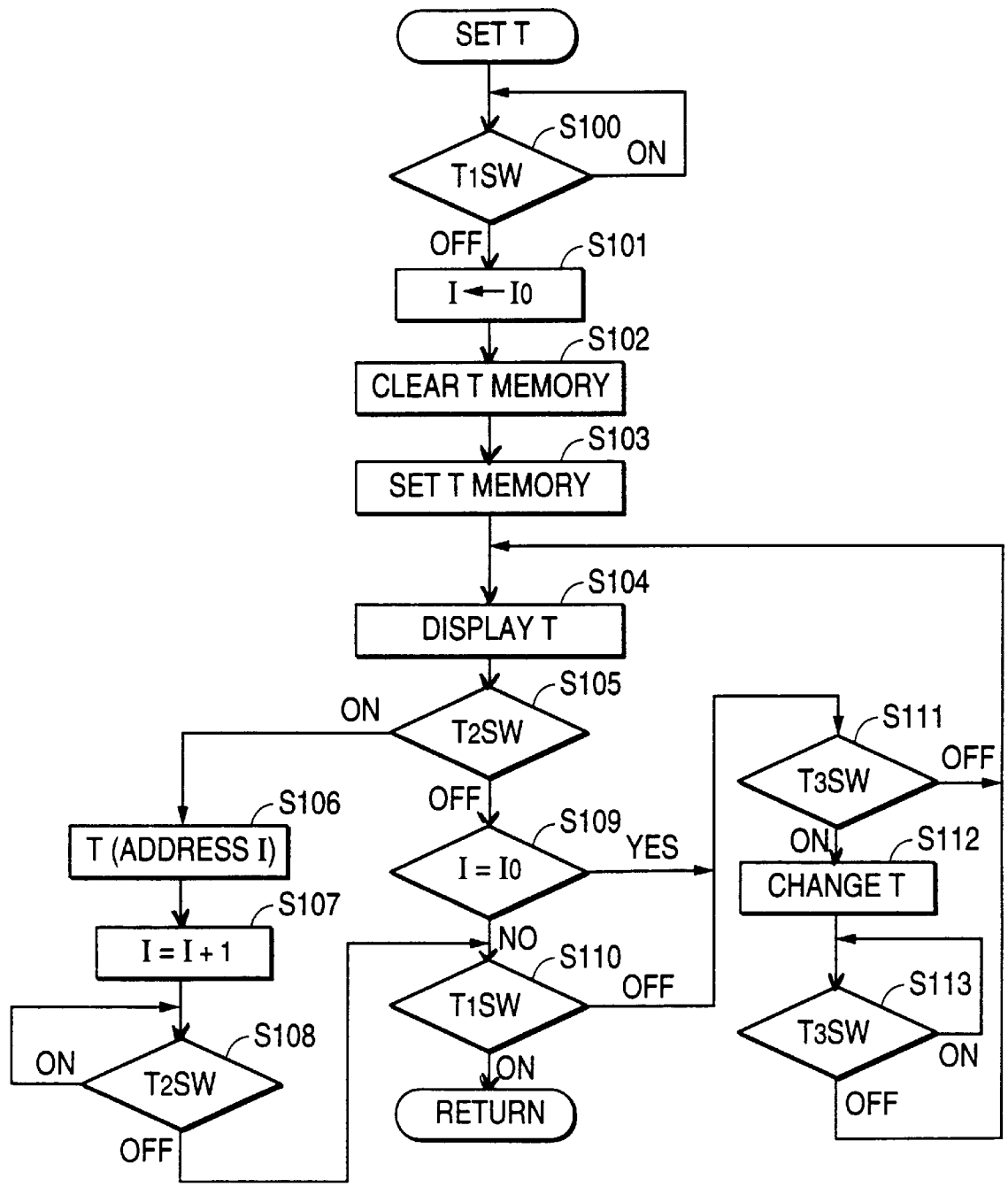

FIG. 19 is a flow chart of details of the test shutter time set routine of step S64. When the routine starts, in step S100, the state of the N switch 11c is determined via the switch detection unit 28. While the N switch 11c is ON, step S100 is repeated until it becomes OFF and the routine proceeds to step S101. In step S101, the address counter I is set to 10. In step S102, the shutter test time set in step S52 is cleared. In step S103, the shutter test time (for example, the highest speed time) is set in the T set memory in the CPU 32. In step S104, the time set in step S103 is displayed on the LCD 34. In step S105, the state of the T2 switch 11e is determined via the switch detection unit 28. If it is ON, the routine proceeds to step S106; if OFF, the routine proceeds to step S109.

In step S106, because the T2 switch 11e was ON in step S105, the shutter test time set in the T set memory is stored at the address I of the T memory. In step S107, the address count I is incremented by 1. In step S108, the state of the T2 switch 11e is determined via the switch detection unit 28. If it is ON, the process is repeated; if it is OFF, the routine proceeds to step S110.

In the case that the T2 switch 11e was not depressed in step S108 or the address count I was not 10 in step S109, the state of the T1 switch 11d is determined via the switch detection unit 28. If the T1 switch 11d is ON, the routine returns to step S58 of FIG. 15; if the T1 switch 11d is OFF, the routine proceeds to step S11.

In step S109 if the address count I was the address 10 or if it was determined in step S110 that the T1 switch 11d was not depressed, the state of the T3 switch 11f is determined via the switch detection unit 28 in step 111. If it is ON, namely if depressed, the routine proceeds to step S112; if OFF, namely not depressed, the routine returns to step S104.

If the T3 switch 11f was determined in step S111 to be depressed, the shutter time T set in the T set memory 32b is changed in step S112. The method of change is upon detecting the ON state of the T3 switch 11f to increment the shutter time T, for example, by 1 Ev. The sequence of shutter times cycles around from the low speed limit to the highest speed shutter time.

In step S113, the state of the T3 switch 11f is determined via the switch detection unit 28. After waiting until the T3 switch 11f is OFF, namely not depressed, the routine returns to step S104.

In carrying out testing at the shutter times to be tested set in step S52 (Ta and Tb), the T1 switch 11d is not depressed even 1 time and the release button 10 may be depressed. To change the number of times of the test, in step S56 the N switch 11c may be depressed the necessary number of times. For example, in setting 3 times as the number of test times, the N switch 11c may be depressed 2 times. In step S57, the shutter time to be tested can be set by pressing the N switch 11c for the number of times.

Figure 18:
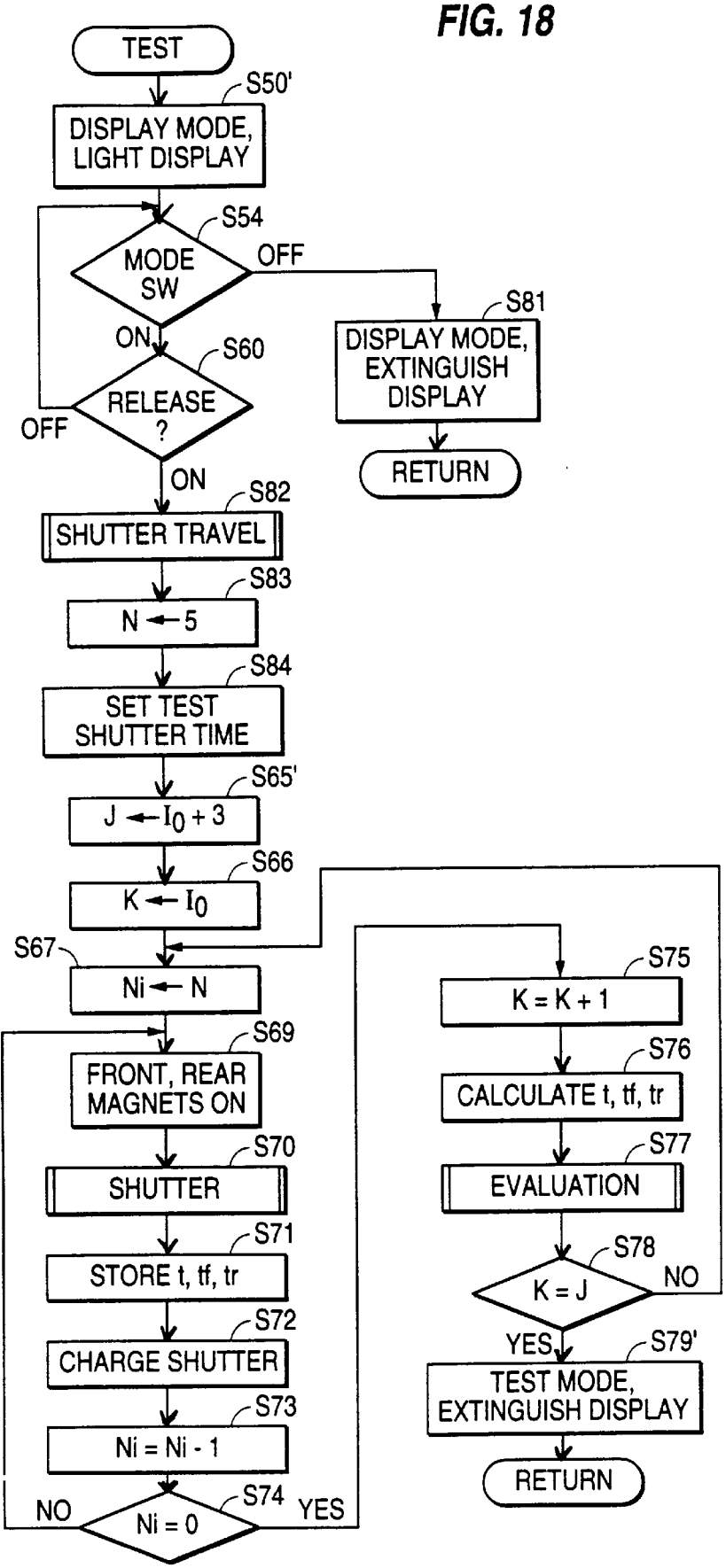

Many variations of the test mode process in step S16 (FIG. 11) are possible. Two variations are illustrated in FIG. 18. In this variation of the test mode process, the number of shutter times to be tested is set to 3, and the number of tests is set to 5. Also, the tests are automatically carried out under set conditions in this embodiment.

In the first variation illustrated in FIG. 18, when the routine starts, the test mode display is displayed on the LCD 34 in step S50'. In step S54, it is determined via the switch detection unit 28 whether or not the mode switch 11a is depressed. If the mode switch 11a is ON, the routine proceeds to step S60, and if the mode switch 11a is OFF, the routine proceeds to step S81.

When it is determined in step S54 that the mode switch 11a was OFF, the test mode displayed in step S50' is extinguished in step S81, and the routine returns to step S3 of FIG. 11.

In step S60, the state of the release button 10 is determined via the switch detection means 28. In the case that the release button is not depressed, the routine returns to step S54.

In the first variation illustrated in FIG. 18, when the release button is depressed, the routine proceeds to step S83 and step S82 is not performed. The second variation illustrated in FIG. 18 in which step 82 is performed will be described below.

In step S83, the number N of times of testing (5 times) is set. In step S84, the shutter times T to be tested are set. In this case, there are 3 shutter times T; as shown in Table 1, these are respectively set in the memory in the CPU 32 as 1/250 second in address 10, 1/2000 second in address 10+1, and 1/8000 second in address 10+2.

TABLE 1

| Memory Address | Shutter Time to Test (Seconds) |
| --- | --- |
| I0 | 1/250 |
| I0 + 1 | 1/2000 |
| I0 + 2 | 1/8000 (highest speed) |

In step S65', the address information of the memory in the CPU 32 set in step S84 is stored in J. This is set to plural shutter times T to be tested and is in the last address+1 address in the CPU 32. In step S66, the address information of the memory in the CPU 32 set in step S84 is stored in the counter K. This is the shutter times T to be tested, and is set in the initial address of the memory of the CPU 32. In step S67, the test number N (in the present example, 5) is stored in the counter Ni. In step S69, the front blind magnet and rear blind magnet are set ON.

In step S70, the shutter control routine to open and close the shutter 8 and control the exposure of the film 31 and the shutter blind travel detection routine by means of the shutter blind travel detection unit 37 are carried out. Moreover, in step S17 of FIG. 12, the shutter time is read from the Kth address in the memory of the CPU 32 as the shutter time T to be tested.

After step S70 is performed, the monitor time t, the measurement time tf, and the measurement time tr obtained are stored in step S71. In step S72, because the exposure action has ended, the shutter mode is actuated and charging of the shutter is performed. In step S73, the counter Ni is decremented. In step S74, it is determined whether the tests have been performed up to the set number of times. If not ended, the routine returns to step S69 and the process of steps S69–S73 is repeated. The monitor time t, measurement time tf, and measurement time tr, obtained each time exposure action is performed, are stored in memory. When it is determined in step S74 that the tests have been performed up to the set number of tests, the routine proceeds to step S75.

In step S75, the value of the address counter K is incremented by 1. In step S76, the time data of monitor time t, measurement time tf, and measurement time tr obtained as above and also stored in memory in step S71, are operated on. In step S77, the evaluation routine described with reference to FIG. 14 is carried out, and in step S76, the calculated monitor time t and measurement times tf and tr are evaluated. In step S78, it is determined whether the set plural number (3 in the present embodiment example) of shutter times to be tested have all been tested. In the case that the tests have not ended, the routine returns to step S79', the process of steps S67–S77 is repeated, and the test times stored in the memory of the CPU 32 are successively, respectively tested according to the number N of tests (5 in this example).

When testing has ended, the routine proceeds to step S79'. In step S79', because the tests have ended, the test mode display which was displayed in step S50' is extinguished, and the routine returns to step S3 of FIG. 11.

Many modifications to this embodiment are possible. For example, in the case of a number of times tested other than 5 times, the required number of times may be set as N in step S83 of FIG. 18. Moreover in the case where it is desired to change the shutter times tested, the times shown in Table 1 as set in the addresses 10 through 10+2 may be changed. Moreover in the case that the number of shutter times tested is set to other than 3 times, the required times may be set in sequence from 10, and furthermore J in step S65' of FIG. 18 may be set, corresponding to this number of times, to the last address of the memory+1 address.

Moreover, a sequence such as the sequence of test shutter times shown in the above example as running from the low speed side to the high speed side does not have to be taken, and it is possible to set them freely. Namely, in a case of the first test after a long period of non-use of the camera, when there is a large fluctuation of the shutter time and the front blind or the rear blind does not open, so that there is a possibility of no test data being obtained at the highest shutter speed time, initially a time other than the highest shutter speed time may be set at the address 10, and the test shutter times may be set in any kind of sequence in the memory other than this. Furthermore, it is also possible that a time of a speed estimated to be safe, lower than a predetermined time of any stages from the high speed time down to the low speed time, is set in the 10 address.

In the second variation illustrated in FIG. 18, a shutter travel routine is performed at step S82. The shutter travel routine of step S82 is a process in which the shutter is actuated at the set shutter time for the set number of times. This process will be described with reference to the flow chart illustrated in FIG. 20.

Figure 21:
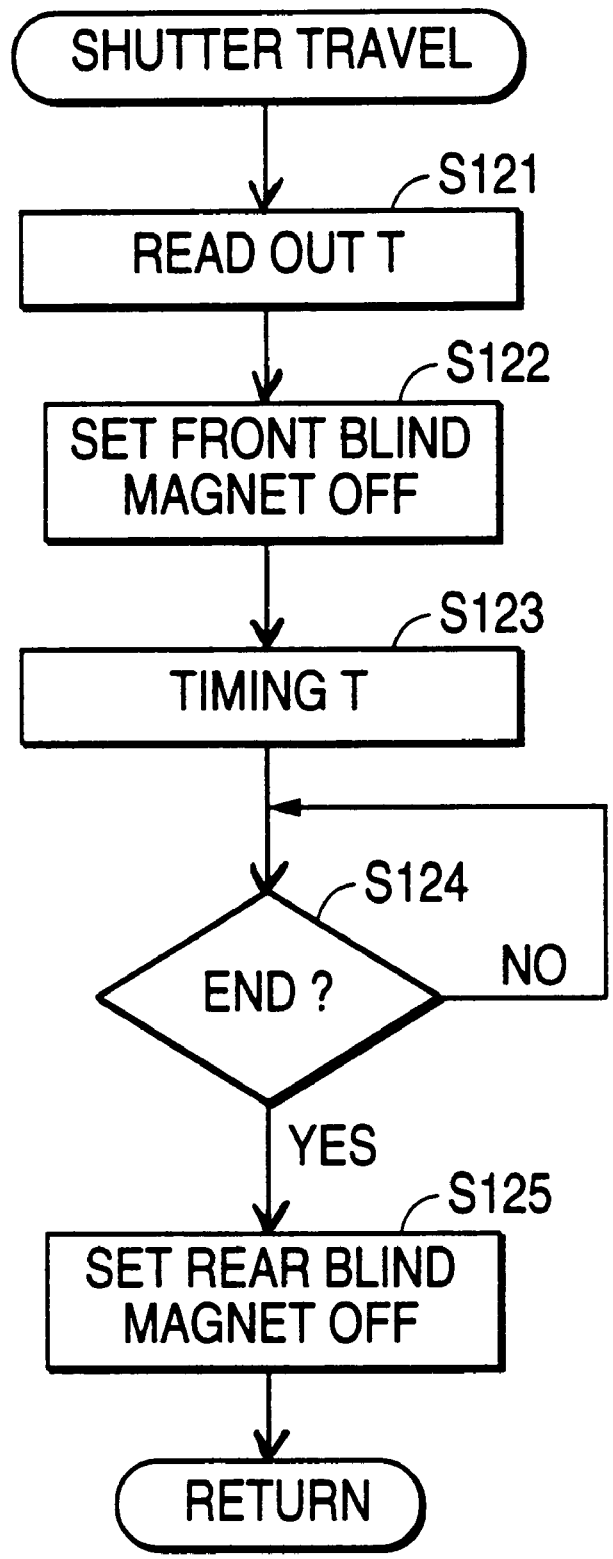

The shutter time is set in step S114. For example, the highest shutter speed time may be set. In step S115, the number of times of actuation of the shutter is set in the counter Ni. In this example, 3 times is set. In step S116, the front blind magnet and rear blind magnet are set ON, as described with reference to FIG. 9. In step S117, the shutter action routine described below with reference to FIG. 21 is carried out. In step S118, because shutter action has ended, the shutter motor of motors 36 is caused to rotate normally and charging of the shutter is performed. In step S119, the counter Ni is decremented. In step S120, it is determined whether shutter actuation has been performed for the number of times set. In the case that it is not ended, the routine returns to step S116, and the process of steps S116 through S119 is repeated. In the case that it is ended, the routine returns to step S83 of FIG. 18.

Figure 20:
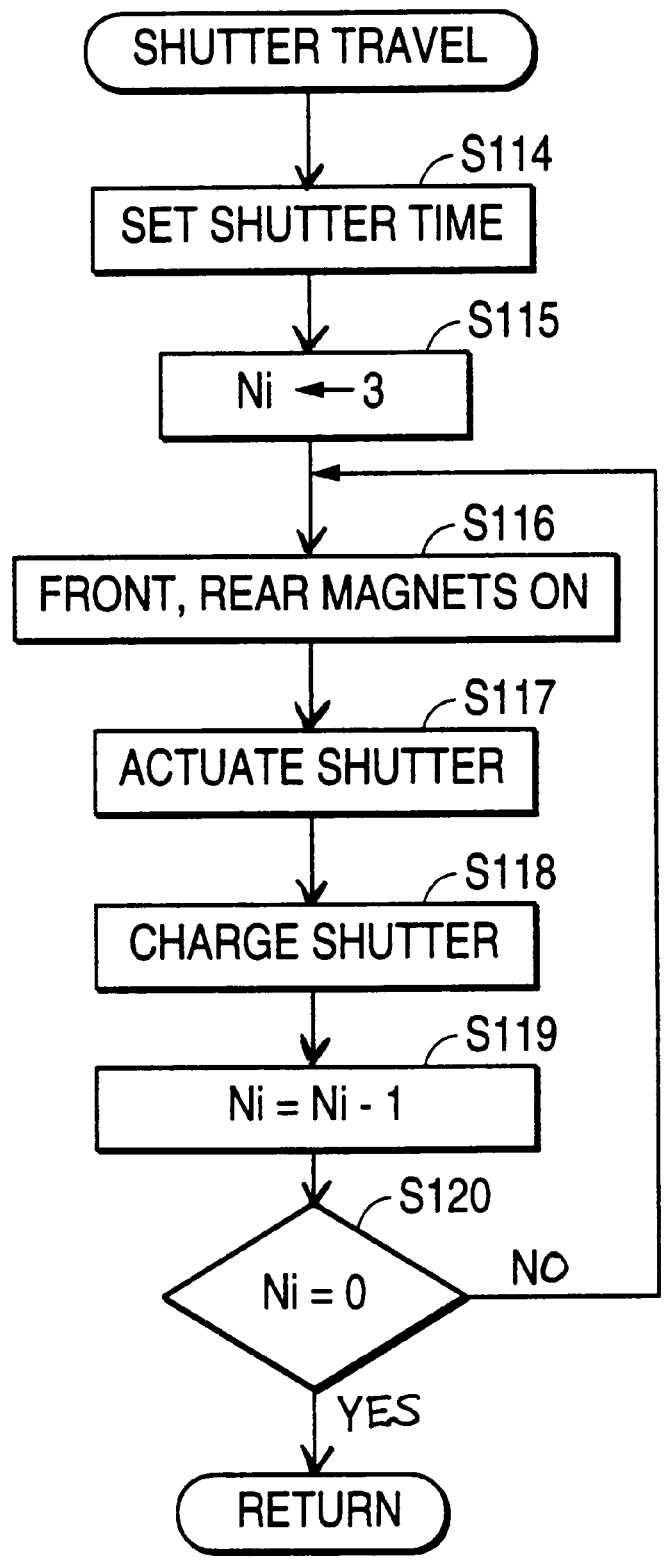

FIG. 21 is a flow chart illustrating in detail the shutter actuation routine (step S117) of FIG. 20. In step S121, the shutter time T set in step S114 (FIG. 20) is read. In step S122, the flow of current to the front blind magnet is ended, and the travel of the front vane group is begun. In step S123, the timing of the shutter time T is started. In step S124, the time completion of the shutter time T is awaited. In step S125, because the shutter time T has elapsed, the flow of current to the rear blind magnet is ended, and the travel of the rear vane group 21 is commenced. After this, the routine returns to step S118 of FIG. 20.

Moreover, if a respective optional shutter time and number of times are set in step S114 and step S115, the shutter can be actuated for this shutter time and number of times.

In the above examples, before carrying out the tests of shutter time, from the number of times actuated a process of shutter time tests similar to that described in FIG. 18 is carried out. By performing shutter actuation before the test, the effects on shutter actuation of non-use for a long period of time are no longer present and the actuation becomes stable; in particular, it is an effective method in the case of invariably using a method for performing a test of shutter time prior to photography. Namely, in the case of using this kind of method, because at the actual time of photography, shutter actuation has been performed due to the test directly before, no effects are received from non-use and it is understood that it is not necessary to take the data in the test influenced by non-use.

By means of the present invention as described above, because tested in sequence from a low speed time, even if the test of shutter time is performed after a long period of non-use, it does not happen that in the first test the front blind or the rear blind does not open and test shutter time data are not obtained. Moreover, the initially tested shutter time may be set to a time other than the highest speed time or a time estimated to be safe, e.g., a time lower than a specific time which is a number of stages lower than the highest speed time, else any other kind of shutter time in any kind of sequence may be tested, and there is the advantage that there is a large number of degrees of freedom for the shutter time test.

Furthermore, by means of other embodiments, in addition to there being no effect due to non-use, there is also the advantage that the action of the shutter is made stable.

Figure 22:
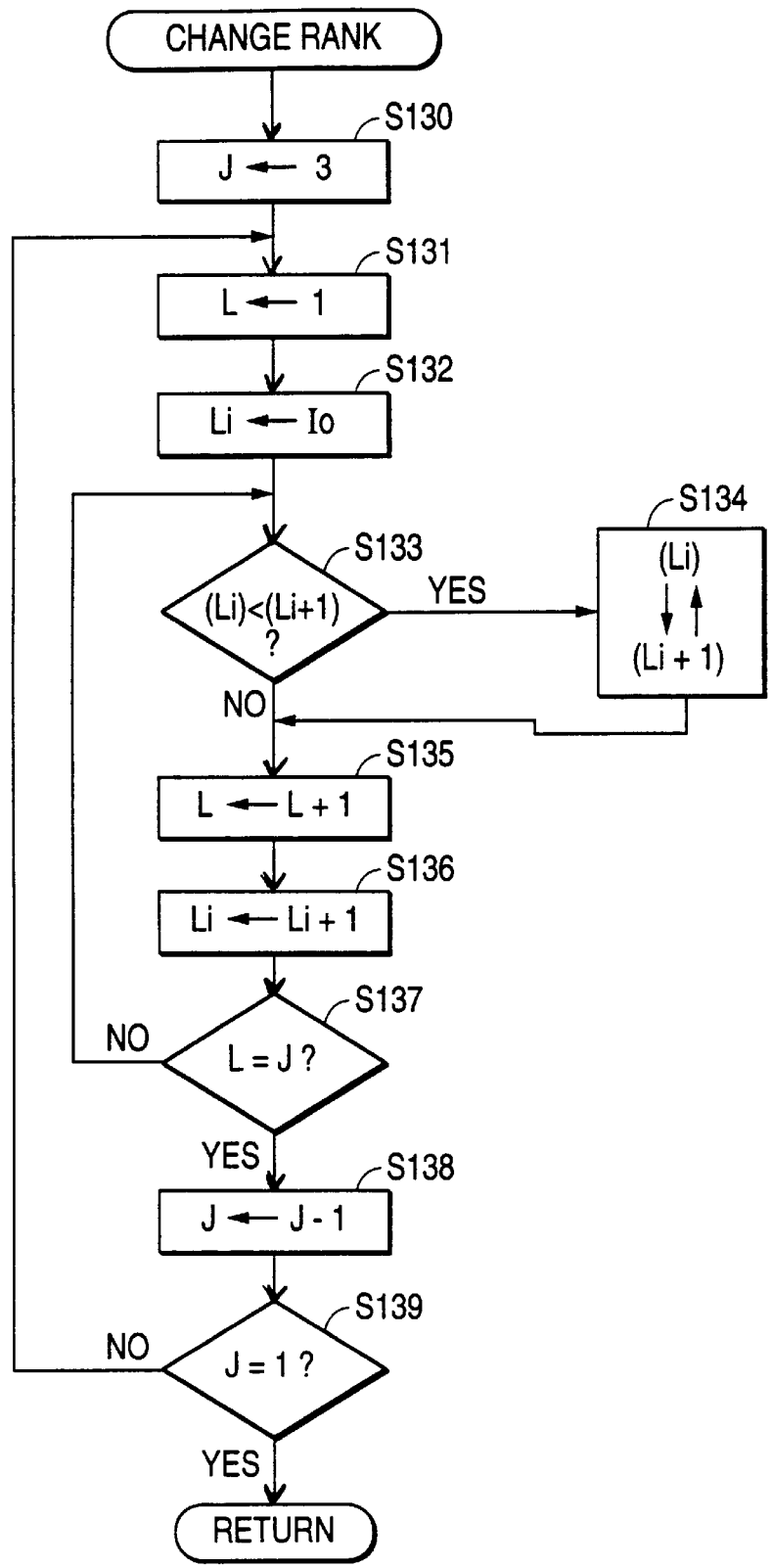

FIG. 22 is a detailed example of a routine to perform rank changes on the test shutter times set in Table 1. This routine is inserted between the routines of steps S84 and S65' in FIG. 18. Then a process is performed of substituting in rank sequence from the test shutter times optionally set in the addresses 10 through 10+3.

In step S130, the number (3) of test shutter times is set in J. In step S131, L is set to 1. In step S132, Li is set to the initial address 10. In step S133, the shutter time of the address Li is compared with the shutter time of the address Li+1, and if it is a speed time higher than the shutter time of the address Li, the routine proceeds to step S134; if not, it proceeds to step S135. In step S134, the shutter time of the address Li and that of the address Li+1 are interchanged. In step S135, L is increased by 1. In step S136, Li is increased by 1. In step S137, L and J are compared; if L=J, the routine proceeds to step S138, and if not, the routine returns to step S133. In step S138, J is decreased by 1. In step S139, if J=1, the routine returns to step S65' of FIG. 18; if not, it returns to step S131. Moreover, in the above routine, if the number of shutter times to be tested is other than 3, J is set to this number in step S130.

The present invention has been described by reference to the above embodiments, but it is possible to make various modifications by means of the technological concept of the present invention. For example, in the above embodiments, the description has been in terms of a shutter having two blinds, a front blind and a rear blind, but it is also possible to apply the present invention to cameras with differently constituted shutters (for example, a lens shutter) and suitable travel state detection devices.

Furthermore, the evaluation of each measurement time is performed according to each shutter time tested, and the evaluation may be finally collected. If at least film forwarding is performed, it does not matter if the mirror mechanism or stop mechanism is also actuated. Moreover the test was carried out even in normal mode, but in the case of not testing, step S11 is omitted from the process routine of FIG. 11; moreover, the processes other than step S22, step S23 and step S25 of the shutter routine shown in FIG. 12 and FIG. 13 and carried out in step S10 of FIG. 11 may be omitted.

Furthermore, it can be arranged so that in the normal mode also, when the back cover 4 is in the opened state, the action of the shutter does not occur: adding before step S6 of FIG. 11 of the process routine of the normal mode, a process such that in the case that the back cover 4 is open, the routine returns to step S1, and only proceeds to step S6 in the case that the back cover 4 is closed.

Also, in the above embodiments, the description has been in terms of a focal plane shutter, but application is possible to testing of the exposure time of a lens shutter and the like.

The many features and advantages of the present invention are apparent from the detailed specification, and thus it is intended by the appended claims to cover all such features and advantages of the system which fall within the true spirit and scope of the invention. Further, numerous modifications and changes will readily occur to those skilled in the art from the disclosure of this invention; thus, it is not desired to limit the invention to the exact construction and operation illustrated and described. Accordingly, suitable modifications and equivalents may be resorted to as falling within the scope and spirit of the invention.

What is claimed is:

1. A camera using a recording medium, comprising:
a shutter limiting exposure time of the recording medium;
a measurement unit measuring the exposure time of the recording medium based on operation of said shutter;
a measurement control unit for inhibiting operation of said measurement unit;
an electrical supply device supplying electricity to said camera; and
a mode selector selecting between a test mode in which said electrical supply device supplies electricity to said camera and said measurement control unit does not inhibit said measurement unit and a normal mode in which said electrical supply device supplies electricity to said camera and said measurement control unit inhibits said measurement unit.

2. A camera as recited in claim 1, wherein said mode selector comprises an external switch, operatively connected to said measurement control unit, to generate a predetermined signal indicating one of the normal and test modes in response to manual operation of said external switch.

3. A camera using a recording medium, comprising:
a shutter limiting exposure time of the recording medium;
a measurement unit measuring the exposure time of the recording medium based on operation of said shutter;
a measurement control unit for inhibiting operation of said measurement unit;
a loading detector for generating a predetermined signal indicating whether the recording medium is loaded into said camera; and
a mode selector selecting between a test mode in which said measurement control unit does not inhibit said measurement unit and a normal mode in which said measurement control unit inhibits said measurement unit in dependence upon the predetermined signal.

4. A camera using photographic film, comprising:
a shutter limiting exposure time of the recording medium;
a measurement unit measuring the exposure time of the recording medium based on operation of said shutter;
a measurement control unit for inhibiting operation of said measurement unit;
a mode selector selecting between a test mode in which said measurement control unit does not inhibit said measurement unit and a normal mode in which said measurement control unit inhibits said measurement unit;
a windup mechanism for winding up the photographic film; and
a windup controller for inhibiting operation of said windup mechanism in the test mode.

5. A camera as recited in claim 1, further comprising:
a shutter release for starting said shutter in response to an external force; and
a number setting unit for setting a number of times said shutter is activated in response to a single operation of said shutter release in the test mode.

6. A camera as recited in claim 1, further comprising a shutter time setting unit for setting the exposure time.

7. A camera using a recording medium, comprising;
a shutter limiting exposure time of the recording medium;
a measurement unit measuring the exposure time of the recording medium based on operation of said shutter;
a measurement control unit for inhibiting operation of said measurement unit;
a mode selector selecting between a test mode in which said measurement control unit does not inhibit said measurement unit and a normal mode in which said measurement control unit inhibits said measurement unit;
a shutter release for starting said shutter in response to an external force; and
a shutter time setting unit for setting at least one of a plurality of different exposure times in the test mode, said shutter, in response to receipt of the external force by said shutter release, repeatedly opening and closing in the test mode in accordance with the at least one of the plurality of different exposure times set in said shutter time setting unit.

8. A camera using a recording medium, comprising:
a back cover for covering the recording medium;
a shutter limiting exposure time of the recording medium;
a measurement unit measuring the exposure time of the recording medium based on operation of said shutter;
a back cover detector for detecting whether said back cover is open when the recording medium is loaded into said camera; and
a measurement control unit for inhibiting operation of said measurement unit when an open state of said back cover is detected by said back cover detector.

9. A camera as recited in claim 8, wherein said measurement control unit inhibits said measurement unit when the open state is detected during action of said shutter.

10. A camera as recited in claim 9, further comprising a warning indicator for warning when said back cover detector detects the open state of said back cover.

11. A camera as recited in claim 10, wherein said warning indicator provides a first warning when the open state is detected during operation of said shutter, and provides a second warning, different from the first warning, when the open state is detected when said shutter is not operating.

12. A camera as recited in claim 8, further comprising a warning indicator for warning when said back cover detector detects the open state of said back cover.

13. A camera as recited in claim 12, wherein said warning indicator provides a first warning when the open state is detected during operation of said shutter, and provides a second warning, different from the first warning, when the open state is detected when said shutter is not operating.

14. A camera using a recording medium, comprising:
a shutter limiting exposure time of the recording medium;

a drive unit for recording an image on the recording medium;

a measurement unit measuring the exposure time of the recording medium based on operation of said shutter;

a control unit controlling said shutter and said measurement unit; and a mode selector selecting between a normal mode in which said shutter and said drive unit are activated and a test mode in which said shutter and said measurement unit, but not said drive unit, are activated.

15. A camera as recited in claim 14, wherein said mode selector responds to an external force by generating a predetermined signal indicating which of the test and normal modes are selected.

16. A camera as recited in claim 14, further comprising a loading detector generating a predetermined signal indicating whether the recording medium is loaded into said camera, and wherein said mode selector selects one of the test and normal modes in dependence upon the predetermined signal.

17. A camera as recited in claim 14, further comprising:

a shutter release for starting said shutter in response to an external force; and a number setting unit for setting a number of times said shutter is activated in response to a single operation of said shutter release in the test mode.

18. A camera as recited in claim 14, further comprising a shutter time setting unit for setting the exposure time.

19. A camera as recited in claim 18, further comprising a shutter release for starting said shutter in response to an external force, wherein said shutter time setting unit sets at least one of a plurality of different exposure times in the test mode, and wherein said shutter, in response to receipt of the external force by said shutter release, repeatedly opens and closes in the test mode in accordance with the at least one of the plurality of different exposure times set in said shutter time setting unit.

20. A camera as recited in claim 14, wherein the recording medium is a photographic film, and wherein said drive unit comprises a forwarding mechanism for the photographic film.

21. A camera as recited in claim 20, wherein said drive unit includes at least one of a stop drive mechanism and a mirror drive mechanism.

22. A camera as recited in claim 20, wherein said measurement unit, during the normal mode, operates in dependence upon the recording of the image.

23. A camera using a recording medium, comprising:

a shutter limiting exposure time of the recording medium;

a measurement unit measuring the exposure time of the recording medium based on operation of said shutter in a test mode;

a loading detector detecting whether the recording medium has been loaded; and a mode selector selecting, based on the detecting by said loading detector, the test mode when the recording medium is not loaded and an image recording mode when the recording medium is loaded.

24. A camera using a recording medium, comprising:

a shutter limiting exposure time of the recording medium;

a measurement unit measuring the exposure time of the recording medium based on operation of said shutter;

a drive unit for recording an image on the recording medium; and a mode selector selecting between a normal mode in which said shutter and said drive unit, but not said measurement unit, are activated and a test mode in which said shutter and said measurement unit are activated.

25. A camera using photographic film, comprising:

a shutter limiting exposure time of the photographic film;

a measurement unit measuring the exposure time of the photographic film based on operation of said shutter;

a windup mechanism for winding up the photographic film;

an electrical supply device supplying electricity to said camera; and a mode selector selecting between a normal mode in which said electrical supply device supplies electricity to said camera and said windup mechanism is activated when a shutter operation is completed and a test mode in which said electrical supply device supplies electricity to said camera and operation of said windup mechanism is inhibited.

26. A method of using a recording medium in a camera, comprising the steps of:

(a) limiting exposure time of the recording medium using a shutter;

(b) measuring the exposure time of the recording medium during operation of the shutter;

(c) supplying electricity to the camera; and (d) selecting between a test mode in which electricity is supplied to the camera and said measuring is performed and a normal mode in which electricity is supplied to the camera and said measuring is inhibited.

27. A method of using a recording medium in a camera, comprising the steps of:

(a) covering the recording medium using a back cover;

(b) limiting exposure time of the recording medium using a shutter;

(c) measuring the exposure time of the recording medium during operation of the shutter;

(d) detecting whether the back cover is open when the recording medium is loaded into the camera; and (e) inhibiting said measuring when an open state of the back cover is detected in step (d).

28. A method of using a recording medium in a camera, comprising the steps of:

(a) operating a shutter of the camera;

(b) recording an image on the recording medium during operation of the shutter in a normal mode;

(c) measuring exposure time of the recording medium during operation of the shutter in a test mode; and (d) selecting between the normal mode in which said operating in step (a) and said recording in step (b), but not said measuring in step (c), are performed and the test mode in which said operating in step (a) and said measuring in step (c), but not said recording in step (b), are performed.

29. A method of using a recording medium in a camera, comprising the steps of:

(a), limiting exposure time of the recording medium using a shutter;

(b) measuring the exposure time of the recording medium based on operation of the shutter in a test mode;

(c) detecting whether the recording medium has been loaded; and (d) selecting, based on said detecting in step (c), the test mode when the recording medium is not loaded and an image recording mode when the recording medium is loaded.

30. A method of using photographic film in a camera, comprising:

(a) limiting exposure time of the photographic film using a shutter;

(b) measuring the exposure time of the photographic film based on operation of said shutter;

(c) winding up the photographic film;

(d) supplying electricity to the camera; and (e) selecting between a normal mode in which electricity is supplied to the camera and said winding in step (c) is performed when step (a) is completed and a test mode in which electricity is supplied to the camera and said winding in step (c) is inhibited.

* * * * *